United States Patent
Yagawa

(10) Patent No.: US 7,269,743 B2
(45) Date of Patent: Sep. 11, 2007

(54) METHOD AND APPARATUS FOR SECURE DATA MIRRORING A STORAGE SYSTEM

(75) Inventor: Yuichi Yagawa, Tokyo (JP)

(73) Assignee: Hitachi, Ltd. (JP)

( * ) Notice: Subject to any disclaimer, the term of this patent is extended or adjusted under 35 U.S.C. 154(b) by 458 days.

(21) Appl. No.: 10/893,068

(22) Filed: Jul. 16, 2004

(65) Prior Publication Data

US 2006/0015946 A1   Jan. 19, 2006

(51) Int. Cl.
*H04L 9/00* (2006.01)
*H04L 9/32* (2006.01)

(52) U.S. Cl. .................. 713/189; 713/193; 380/44; 380/282

(58) Field of Classification Search ............... 713/189, 713/193; 380/277, 281–282, 284–285, 44
See application file for complete search history.

(56) References Cited

U.S. PATENT DOCUMENTS

| 5,649,152 | A | 7/1997 | Ohran et al. |
|---|---|---|---|
| 5,778,395 | A | 7/1998 | Whiting et al. |
| 6,101,497 | A | 8/2000 | Ofek |
| 6,370,626 | B1 | 4/2002 | Gagne et al. |
| 6,529,976 | B1 | 3/2003 | Fukuzawa et al. |
| 6,615,225 | B1 | 9/2003 | Cannon et al. |
| 6,754,827 | B1 | 6/2004 | Cane et al. |
| 7,051,182 | B2 * | 5/2006 | Blumenau et al. .......... 711/202 |
| 2004/0030852 | A1 | 2/2004 | Coombs et al. |

* cited by examiner

*Primary Examiner*—Hosuk Song
(74) *Attorney, Agent, or Firm*—Townsend and Townsend and Crew LLP

(57) ABSTRACT

A secure data mirroring capability in a storage system includes encrypting data blocks in a primary volume in preparation for a data mirroring operation. The encrypted data blocks are mirrored to a secure secondary volume. Host systems provide keys from which encryption keys are produced for encrypting the data blocks. Access to data on the secure secondary volume requires decryption using the key that was used to produce the encrypted data blocks.

44 Claims, 23 Drawing Sheets

|   | 0 | 1 | 2 | 3 | 4 | 5 | 6 | 7 |
|---|---|---|---|---|---|---|---|---|
| 0 | 0 | 0 | 1 | 0 | 0 | 1 | 0 | 0 |
| 1 | 0 | 0 | 0 | 1 | 0 | 0 | 0 | 1 |
| 2 | 0 | 0 | 0 | 0 | 0 | 1 | 0 | 0 |
| : | : | : | : | : | : | : | : | : |
| n | 0 | 0 | 1 | 0 | 0 | 1 | 0 | 0 |

Fig. 7

|   | 0 | 1 | 2 | 3 | 4 | 5 | 6 | 7 |
|---|---|---|---|---|---|---|---|---|
| 0 | 0 | 0 | 0 | 0 | 0 | 0 | 0 | 0 |
| 1 | 0 | 0 | 0 | 1 | 1 | 1 | 1 | 1 |
| 2 | 1 | 1 | 1 | 1 | 1 | 0 | 1 | 1 |
| : | : | : | : | : | : | : | : | : |
| n | 1 | 1 | 0 | 1 | 1 | 0 | 1 | 1 |

METHOD AND APPARATUS FOR SECURE DATA MIRRORING A STORAGE SYSTEM

BACKGROUND OF THE INVENTION

The present invention is generally related to storage systems and in particular to secured data mirroring capability in storage systems.

Generally speaking, it is very common to provide data mirroring functionality for a storage system that is implemented using microcode program in the storage system. FIG. 3 shows a conceptual view of the data flow for a full data mirroring method, which is very typical in current storage products.

In the storage system shown in FIG. 3, suppose there are two volumes 81a and 82a. The volume 81a is called a Primary Volume or P-Vol, where original or production data is stored. The volume 82a is called a Secondary Volume, S-Vol or mirrored volume, where mirrored data from the P-Vol 81a is stored. These two volumes are collectively referred to as a pair, and are in an operational state commonly referred to as the PAIR state. In this state, data that is written to the P-Vol will be mirrored to the S-Vol.

Hosts 1, 2 and 3 are shown connected to the storage system. Host 1 writes data to the storage system. Of course, it is understood that Host 1 also reads data from the storage system, although that is not shown in the figure. A data block is the typical unit of data for a read or a write operation. Any host, including Hosts 1, 2, and 3 can access the S-Vol 82a. The host can read data from the S-Vol. Data write operations can be performed when the pair is in an operational state commonly referred to as SPLIT. In the SPLIT state, the data mirroring operation is not performed (i.e., suspended).

In FIG. 3, a data block 101a is the object of a Write operation to the P-Vol 81a. In the P-Vol 81a, the block is stored in a location 103a. In the PAIR state, a copy 104a of the data block is stored on the S-Vol 82a. The copy is stored at the same address 113a in the S-Vol 82a as the address 103a in the P-Vol 81a. Host 2 or 3 can then access the data block 101a respectively as blocks 11a, 112a by accessing location 113a in the S-Vol 82a.

As explained, the mirrored volumes are read/write compatible by other hosts and can be used for any purpose. Typical examples in which data mirroring can be used include application testing and development, data mining/data warehousing, rapid data restores, and non-disruptive backup or maintenance procedures.

Another mirroring method called Snap Shot or Copy on Write stores only the changed data blocks in a storage pool. These methods result in a volume savings as compared to the full mirroring method explained in FIG. 3 since only differences are maintained.

The proliferation of electronic information has created demands for data security and data privacy. Users want secure data management in their storage systems. A motivating factor is the trend toward a shared storage model. It is increasingly common for users to share the storage system among different organizations because the shared storage model is very efficient in terms of storage purchasing costs and storage management costs. Storage service providers especially benefit by using the shared storage model, and thus the shared storage model is a common implementation.

However, the shared storage model also increases the risk of data exposure to other organizations, and more importantly to potentially unauthorized users. The risk includes intentionally stealing data as well as accidental data exposure. Users understandably want to protect their data from such risks.

Generally speaking, the risk of data exposure is greater for the mirrored data that is stored in the secondary volume than for original data stored in the primary volume. First, other hosts can access the secondary volume after it is created, as explained the above. Access to the primary volume is not a easily achieved because, for example, the host is already attached to the primary volume. For example, if the Host 1 and the Host 3 belong to different organizations, then the Host 3 should not be able to access the mirrored volume 82a. However, enforcing such restrictions is not always convenient to do.

Second, there is a tendency that users care more about the original data that is stored in the primary volume than for mirrored data that is stored in the secondary volume. As a result, people tend to give less attention to the mirrored data. This tendency increases the risk of data exposure more in case of the mirrored data than for the original data.

There is a need to provide secure data mirroring capability in a storage system in order to protect the mirrored data from the risk of data exposure.

SUMMARY OF THE INVENTION

The present invention includes a storage system capable of secure data mirroring. The storage system obtains a copy key used for encrypting blocks of data on a primary volume. The encrypted blocks of data are then mirrored to a secondary volume. The copy keys are associated with host systems. Data access from the secondary volume requires the copy key that was used to encrypt the data being accessed.

BRIEF DESCRIPTION OF THE DRAWINGS

Aspects, advantages, and novel features of the present invention will become apparent from the following description of the invention presented in conjunction with the accompanying drawings, wherein:

FIG. 7 is an update bitmap table according to an illustrative implementation of an embodiment of the present invention;

FIG. 8 is a copy bitmap table according to an illustrative implementation of an embodiment of the present invention;

DESCRIPTION OF THE SPECIFIC EMBODIMENTS

Figure 1:
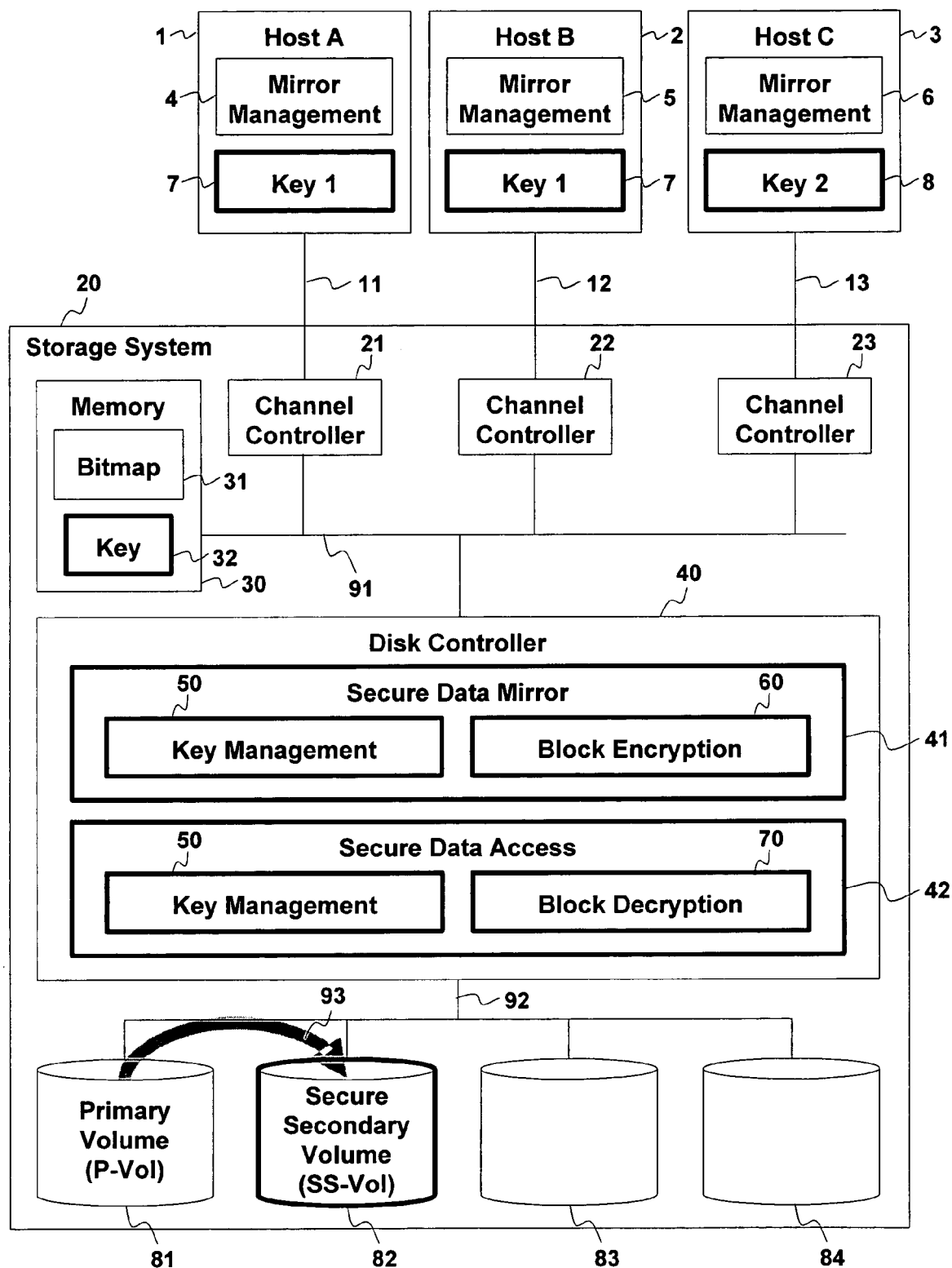
FIG. 1 is a block diagram showing a configuration of a storage system according to an illustrative embodiment of the present invention.

FIG. 1 shows a simplified block diagram of a storage system 20 according to an embodiment of the present invention.

Several host systems 1, 2, 3 are shown in data communication with the storage system 20 over suitable storage networks 11, 12, 13. Though not shown in FIG. 1, the hosts 1, 2, 3 include suitable interface hardware (e.g., host bus adapters) for connection to the storage networks 11, 12, 13. Examples of storage networks include SANs (storage area networks) based on Fibre Channel and SCSI (small computer system interface) standards, NAS (network attached storage) based on IP (internet protocol), NFS (network file system), and CIFS (common internet file system) protocols, virtualization systems, and the like. Generally, the storage system 20 provides the physical storage which constitute the storage networks 11, 12, 13.

The storage system 20 generally includes channel controllers 21, 22, 23, a memory component 30 (one memory is shown in the figure, but the number is not limited to one), one or more disk controllers 40 (although one is shown to simplify the diagram), and storage devices or volumes 81, 82, 83, 84 (four volumes are shown in the figure, but the number is not limited to four). These components are connected to each other through internal networks 91 and 92. In accordance with a specific implementation, the storage system provides RAID (Redundant Array of Independent Devices) capability in order to improve reliability of the stored data and to provide other benefits offered by RAID architectures.

The channel controllers 21, 22 and 23 serve as interfaces for connection with the hosts 1, 2, 3. The physical storage devices are organized by the disk controller into logical volumes. In this embodiment, the volumes 81-84 are configured to be logical volumes, which are protected by RAID. For example, FIG. 1 shows that host 1 is associated with the logical volume 81 identified as a primary volume (P-Vol). Another logical volume 82 is identified as a secure secondary volume (SS-Vol). These volumes will be discussed in more detail below.

The memory component 30 may include a cache memory component and a random access memory (RAM) component. The memory 30 stores, among other things, information for supporting data mirroring operations according to the present invention. As will explained in more detail below, a bitmap region 31 contains bitmap information for data mirroring. The memory 30 includes a key region 32 for storing keys used for data mirroring.

The disk controller 40 provides data control functionality including mirroring 41, access 42, stripping, parity processing and so on. These functions are usually implemented in microcode programs which execute on the disk controller 40. The disk controller 40 provides functionality in accordance with the present invention, including key management 50, encryption 60, and decryption 70. These functions can be provided in microcode programs or with custom logic or by a combination of hardware and software. The functionality will be discussed in further detail below.

The internal networks 91, 92 provide power, control signals, and data routing capability to support the storage system 20. The internal network 91 provides data and control communications among the channel controllers 21, 22, 23, the memory component 30, and the disk controller(s) 40. The internal network 92 provides data and control communications among disk controllers and volumes. Examples of internal networks include PCI, Fibre Channel, and so on. FIG. 1 shows a bus architecture, but it can be appreciated that other architectures such switch architectures, matrix architectures, and so on can be used to implement the internal networks 91, 92.

The hosts 1, 2, 3 include mirror management functions 4, 5 and 6, respectively, that control data mirroring operations in the storage system 20. If a host does not require data mirroring, then that host will not be configured to include mirror management capability. An implementation of the mirror management function is by way of a scripting language such as PERL, or UNIX shell scripts. In an alternate embodiment (not shown), a dedicated host referred to as a service processor can be provided to control data mirroring operations.

A typical control flow for performing conventional data mirroring includes: a host (e.g., host 1) issuing one or more commands to the storage system 20 to initiate data mirroring in the storage system. The disk controller 40 executes appropriate data mirroring microcode programs in response to the commands. As shown in FIG. 1, the P-Vol 81 is connected to (associated with) the host 1. The volume 82 is designated as a secondary volume and is the target volume for the data mirroring operation. Bitmap tables stored in the bitmap regions 31 in the memory 30 are used to conduct the data mirroring operation, keeping track of which data blocks have been updated and which data blocks need to be mirrored. When data mirroring is in effect, data written to the P-Vol is "mirrored" (93) to the secondary volume. More particularly, the data is stored in the same location (i.e., same block address) on the secondary volume as it is stored in the P-Vol.

Though FIG. 1 shows a single secondary volume, it can be appreciated that data mirroring can be targeted to more than one secondary volume. It is further understood that cascaded mirroring can be performed, where data is mirrored to a secondary volume SV-1, data in the secondary volume SV-1 is mirrored to another secondary volume SV-2, and so on in cascading fashion. Still other data mirroring configurations are known. It will be clear that the present invention is readily adapted to all such data mirroring configurations.

As will be explained in more detail below, the foregoing data mirroring steps are enhanced with the following aspects of the present invention. The hosts 1, 2, 3 contain encryption keys (respectively, Key 1, Key 1, Key 2). These encryption keys are communicated to the storage system 20 in connection with a data mirroring operation. The secure data mirroring functionality 41 in the disk controller 40 contains key management capability 50, which manages the keys stored in the key region 32 in the memory 30 in a secure way as long as data mirroring is in effect. When data mirroring is terminated, the keys that are stored in the key region 32 are deleted from the memory 30.

The secure data mirroring functionality 41 also includes a block encryption capability 60. This function is performed when data mirroring is in effect. The result is that the secondary volume contains encrypted data. This is emphasized in FIG. 1 by referring to the secondary volume as a secure secondary volume, a secured secondary volume, a secure volume, and so on (SS-Vol).

A further aspect of the present invention is accessing the SS-Vol 82. The secure data access functionality (e.g., microcode program) 42 contains key management capability 50, which manages the keys in the key region 32 in the memory 30 in a secure way for the duration that the SS-Vol 82 is being accessed. After the volume access is terminated, the keys in the key region 32 are deleted from the memory 30. The secure data access function 42 also includes block decryption capability 70 using the keys. The block decryption capability 70 is executed for the duration that a host is accessing the SS-Vol 82.

As an example, suppose the mirror management function in host 1 is invoked to initiate data mirroring using Key 1. In response, the data on the P-Vol 81 is encrypted and mirrored to the SS-Vol 82. Suppose the host 2 belongs to the same organization as the host 1 and contains the same key, namely, Key 1. Host 2 will be able to decrypt the encrypted data on SS-Vol 82 to produce clear data and thus gain access to the data. Suppose that host 3 belongs to an organization different from that of host 1, and thus contains a key Key 2 that is different from Key 1. The host 3 will receive unintelligible data when it reads from the SS-Vol. 82 because an incorrect key was applied to the encrypted data during the decryption process.

It will be seen from the following discussion that keys can be shared among hosts in any of a number of ways. For example, each key can be stored in a smart card format. The smart card can be inserted into a suitable reader installed in a computer such as a desktop or a laptop and the stored key can be read. As another example, keys can be exchanged through over a communication network in a secured manner. The access can be controlled by using a password or by an ordinal key exchange protocol like using digital signature.

Public key encryption (asymmetric encryption) techniques can be used. The public—key/private-key pair generated in accordance with a public key encryption method can be used for encryption and decryption. One of the keys (e.g., the private key) from the key pair can be stored in the host, while the other key (e.g., the public key) from the key pair is stored in the storage system. This aspect of the invention will be discussed in further detail below.

FIG. 1 shows an embodiment of the present invention in which the physical storage which constitutes the secure secondary volume (SS-Vol) is co-located with the physical storage which constitutes the primary volume (P-Vol). It can be appreciated, however, that the location of the SS-Vol is not relevant to present invention, and that the physical storage which constitutes the SS-Vol can be any suitable physical location in a storage system separate from the storage system of the P-Vol.

Figure 1A:
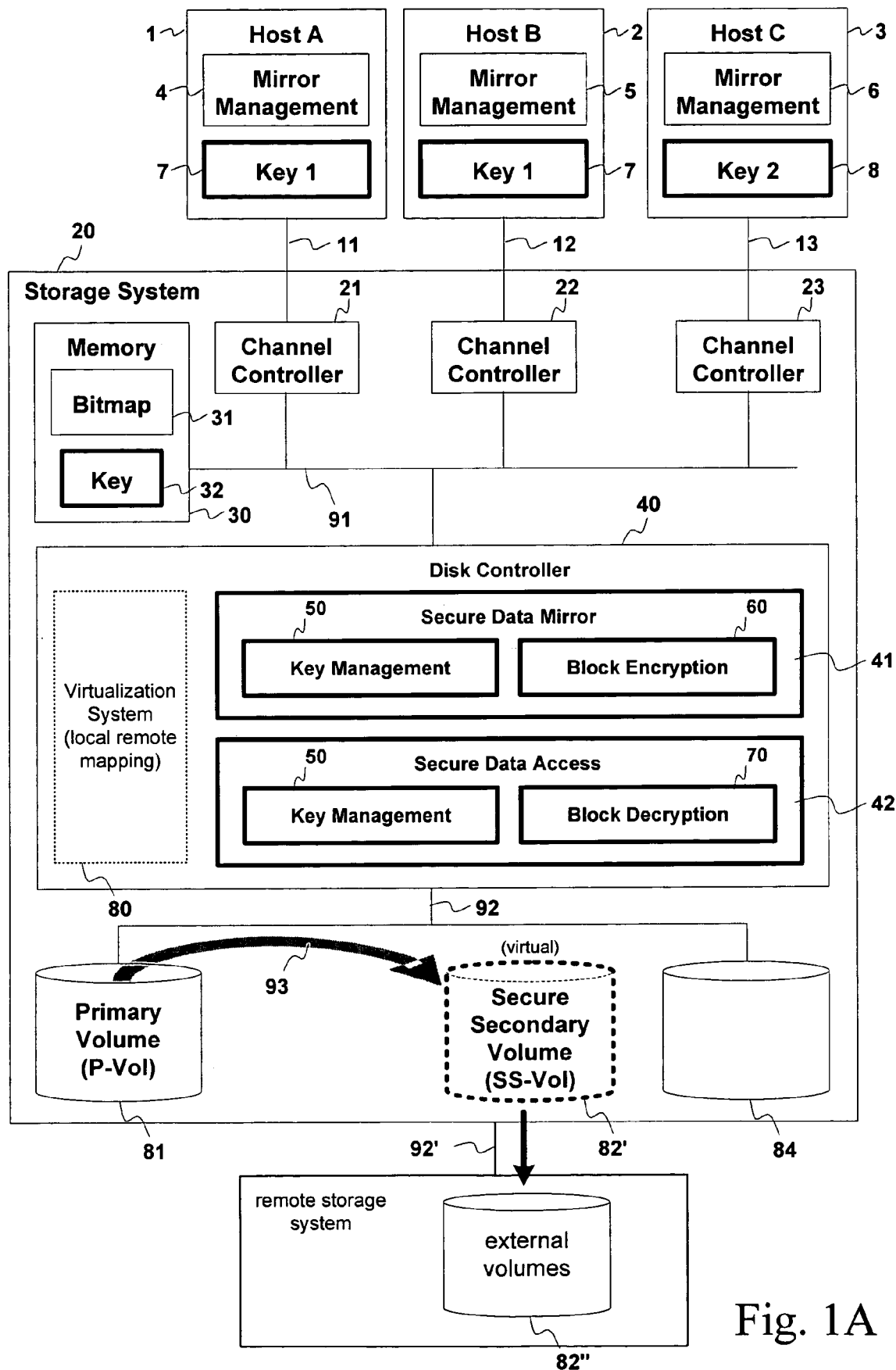
FIG. 1A is a block diagram showing an alternative configuration of a storage system according to the present invention.

FIG. 1A shows an embodiment of the present invention in which the storage system 20 includes a storage virtualization component 80. The storage virtualization component 80 is a set of hardware and software (firmware) configured to present a virtual volume 82' that is comprised of one or more external volumes 82" in a remote storage system (also referred to as external storage system). The virtualization component 80 maps external volumes and logical volume addresses. Write operations made to a virtual volume are translated by the virtualization component 80 to one or more subsequent write operations to the constituent external volumes. An example is shown in U.S. Pat. No. 6,529,976, entitled "Heterogeneous Computer System, Heterogeneous Input Output System and Data Backup Method for the Systems" and is fully incorporated herein by reference for all purposes. The external volumes 82", in turn, can be provided within the storage system 20, or at a location separate (or is otherwise remote) from the storage system. Data mirroring in accordance with the present invention can proceed as will be described below, with the virtual volume 82' as the target of the data mirroring operation. The virtualization system 80 transparently converts data access with the virtual volume 82' to corresponding operations on the external volumes 82".

Figure 1B:
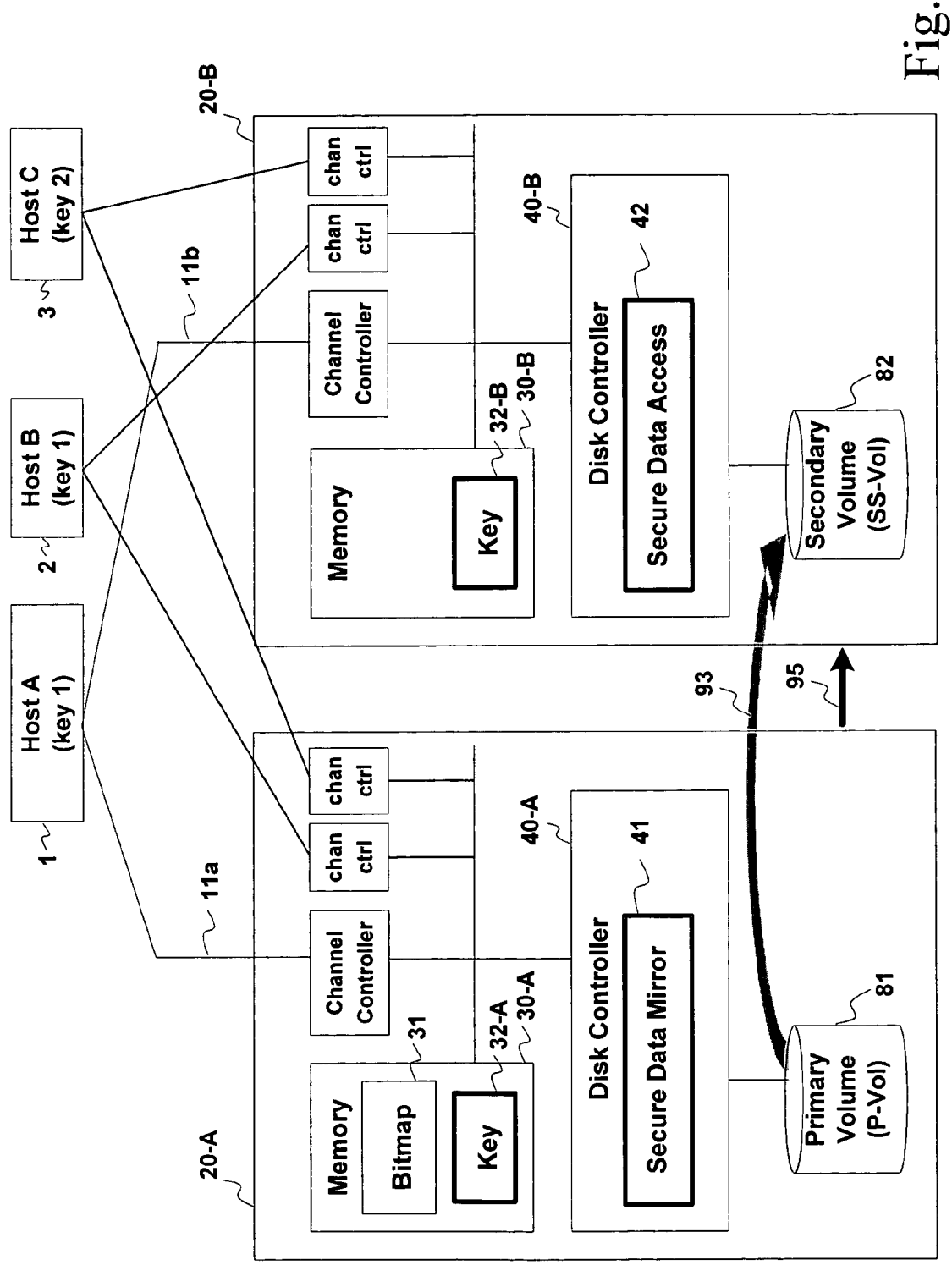
FIG. 1B is a block diagram showing yet another alternative configuration of a storage system according to the present invention.

FIG. 1B shows yet another embodiment of the present invention in which the primary volume 81 and the secure secondary volume 82 are located in different storage systems, 20-A and 20-B respectively. Each host 1, 2, 3 can be configured with a communication channel to each storage system; e.g., the figure shows host 1 having a communication channel 11*a* for communication with storage system 20-A and a communication channel 11*b* for communication with storage system 20-B. Typically each host is configured with high availability (HA) software which provides safe failover software for each storage system. The storage systems 20-A and 20-B can be in different locations within a computer room, or they can be in different buildings, or in different parts of the world. The disk controller 40-A in the storage system 20-A is configured with the Secure Data Mirror function 41. The disk controller 40-B in the storage system 20-B is configured with the Secure Data Access function 42. A suitable communication channel 95 (e.g., remote copy technology) is provided between the storage systems 20-A and 20-B to allow data mirroring in accordance with the present invention (93) to occur between the P-Vol and the SS-Vol. How and where the storage system 20-B will be deployed will depend on a consideration of factors that are independent of the present invention.

Secure data mirroring and secure data access in the configuration of FIG. 1B are achieved in the same fashion as in the configuration of FIG. 1. For example, suppose in FIG. 1B the mirror management function in host 1 is invoked to initiate data mirroring with Key 1. In response, the data on the P-Vol 81 is encrypted via the Secure Data Mirror function 41 and mirrored over the communication channel 95 to the SS-Vol 82. Suppose that a host 2 belongs to the same organization as the host 1 and contains the same key, namely, Key 1. Host 2 can access the mirrored data stored in the SS-Vol 82 by accessing the remote storage system 20-B using the Key 1 via the Secure Data Access function 42 in the storage system 20-B. Host 2 will be able to decrypt the encrypted data on SS-Vol 82 to produce clear data and thus gain access to the data. Suppose that host 3 belongs to an organization different from that of host 1, and thus contains a key Key 2 that is different from Key 1. Host 3 will receive unintelligible data when it reads from the SS-Vol. 82 because an incorrect key was applied to the encrypted data during the decryption process.

Figure 1C:
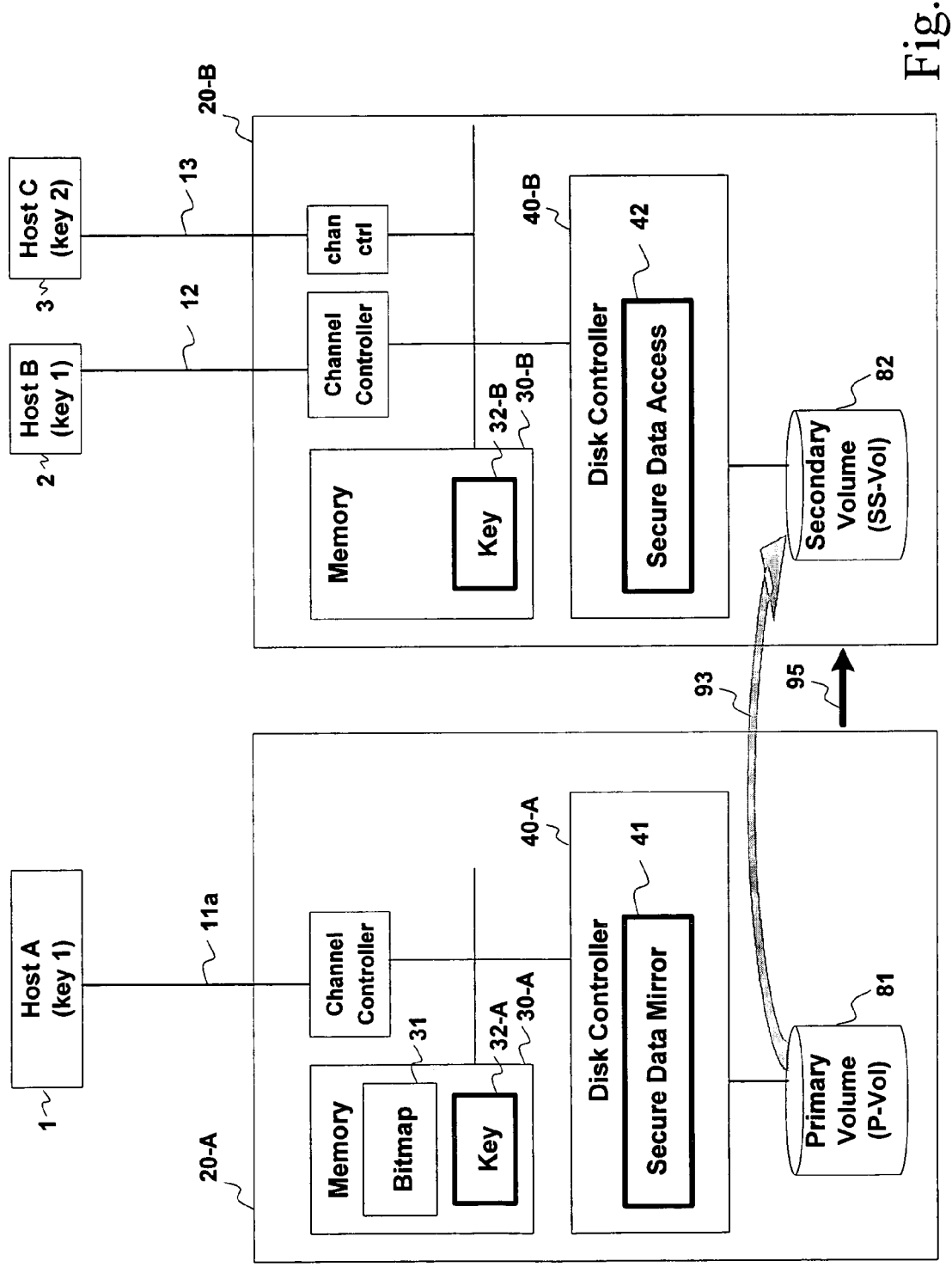
FIG. 1C is a block diagram showing still another configuration of a storage system according to the present invention.

The discussion which follows is made with respect to the configuration of FIG. 1. A person of ordinary skill, however, will be able to adapt the specific embodiment of FIG. 1 to the configurations shown in FIGS. 1A and 1B, and to combinations of the configurations of FIGS. 1A and 1B. For example, the storage system 20b shown in FIG. 1B can itself be a virtualization system. Another example is shown in FIG. 1C, wherein the host 1 is configured to access only the storage system 20-A, and hosts 2 and 3 have access only to the storage system 20-B.

Figure 2:
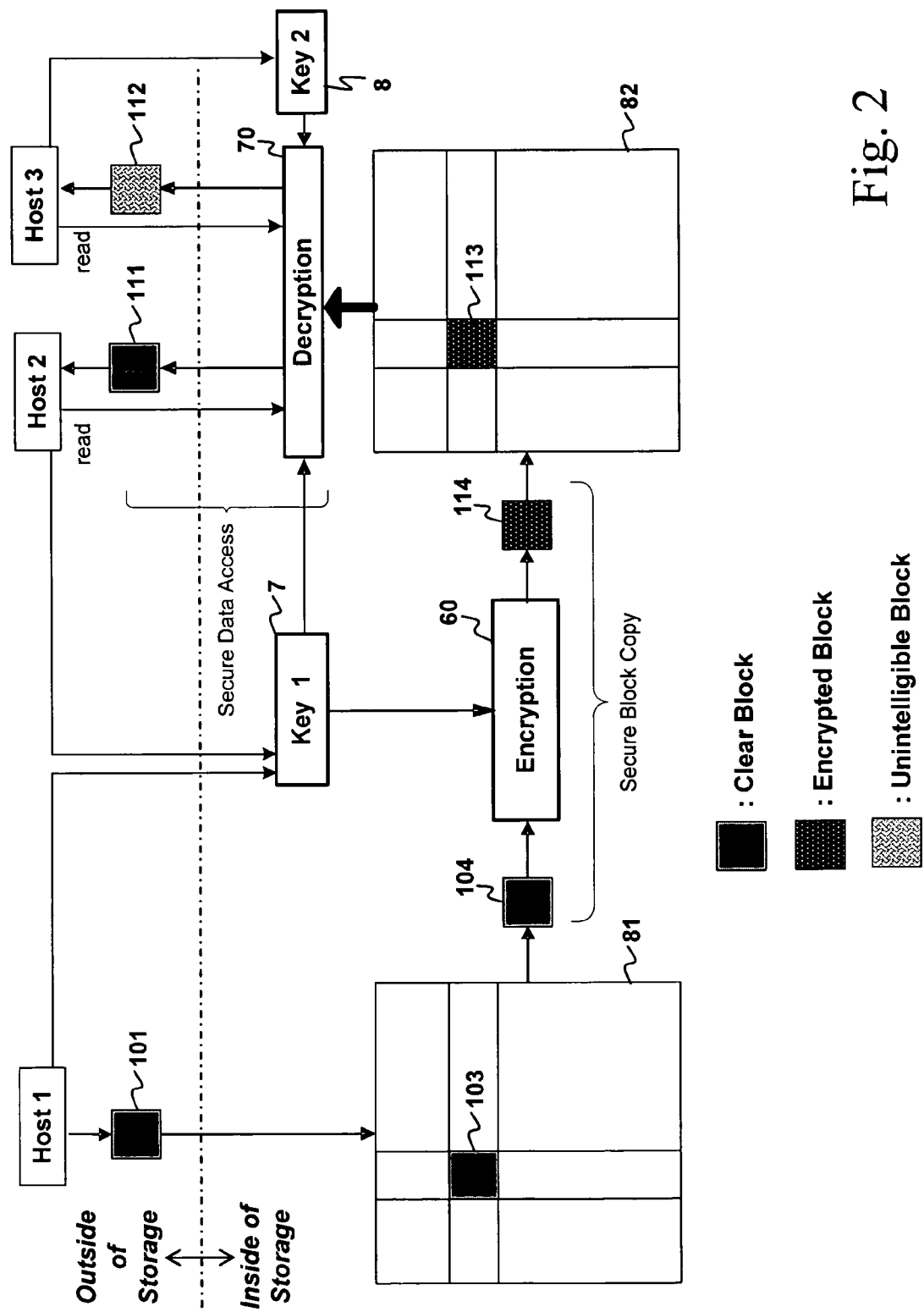
FIG. 2 is a functional illustration of data mirroring according to the present invention.
Figure 3:
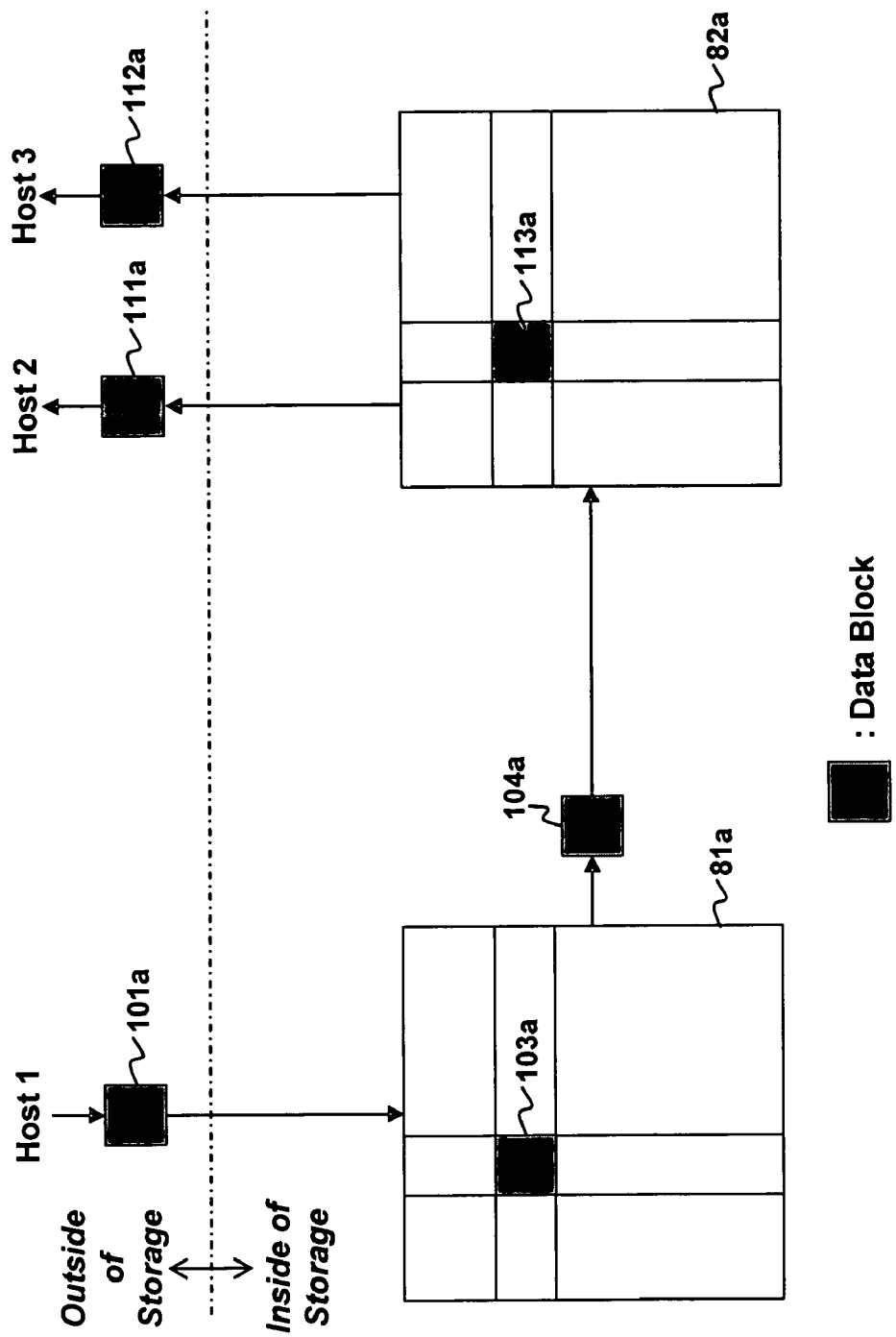
FIG. 3 illustrates a prior art data mirroring technique.

FIG. 2 represents a generalized data flow during data mirroring according to the present invention. A host 1 writes a block of data 101 to a primary volume (e.g., P-Vol 81). The block of data is stored at location 103 in the P-Vol 81. When the block of data 101 is to be mirrored, a copy 104 of the block of data is produced. The block encryption function 60 applies a suitable encryption key (the copy key) to the copy 104 to produce an encrypted block 114. The copy key is derived from Key 1 that was provided by the host 1. The encrypted block 114 is communicated to a secure secondary volume (e.g., SS-Vol 82), where it is stored in a location 113 that is the same as location 103 in the primary volume 81. The foregoing sequence is referred to as a "Secure Block Copy" operation.

FIG. 2 also shows a generalized data flow for accessing encrypted data from the secure secondary volume 82. The host 2 will pass Key 1 to the storage system 20 in connection with access operations to the secure secondary volume 82. If the host 2 makes a read request to access data stored at the location 113 in the secure secondary volume 82, the data stored at that location will be read out by the disk controller (40, FIG. 1) and processed by the block decryption function 70. The block of data read from the location 113 will be decrypted using the Key 1 associated with the host 2. Since this is the same key as the encryption is used for the decryption, the block of data 111 (read-out data) that is produced is clear data. Thus, the read-out data that is returned to the host 2 is clear data. This sequence is identified in FIG. 2 as a "Secure Data Access" operation.

Likewise, the host 3 will pass Key 2 to the storage system 20 in connection with access operations to the secure secondary volume 82. If the host 3 makes a read request to access data stored at the same location 113 in the secure secondary volume 82, the data stored at that location will be read out by the disk controller (40, FIG. 1) and processed by the block decryption function 70. The block of data read from the location 113 will be decrypted using the Key 2 associated with the host 3. However, since the key (Key 2) is different from the key (Key 1) that was used to perform the encryption, the result that is produced is a non-decrypted and very likely an unintelligible block of data 112. The decryption process using Key 2 produces unintelligible read-out data (data block 112) that is returned to the host 2. The first read-out data 111 that was returned to the host 2 is different from the second read-out data 112. In this way, host 3 is effectively denied access to the data stored in the secure secondary volume 82, even though host 3 was able to read the encrypted block of data stored at the location 113.

From the foregoing, the following is understood. Encrypted data is data that is produced from an encryption operation performed on "original data." Decrypted data is data that results from a decryption operation performed on the encrypted data. The decrypted data can be further referred to as "clear data" if the decrypted data is the same as the original data. On the other hand, the decrypted data can be referred to as "unintelligible data" if the decrypted data is not the same as the original data.

Figure 4:
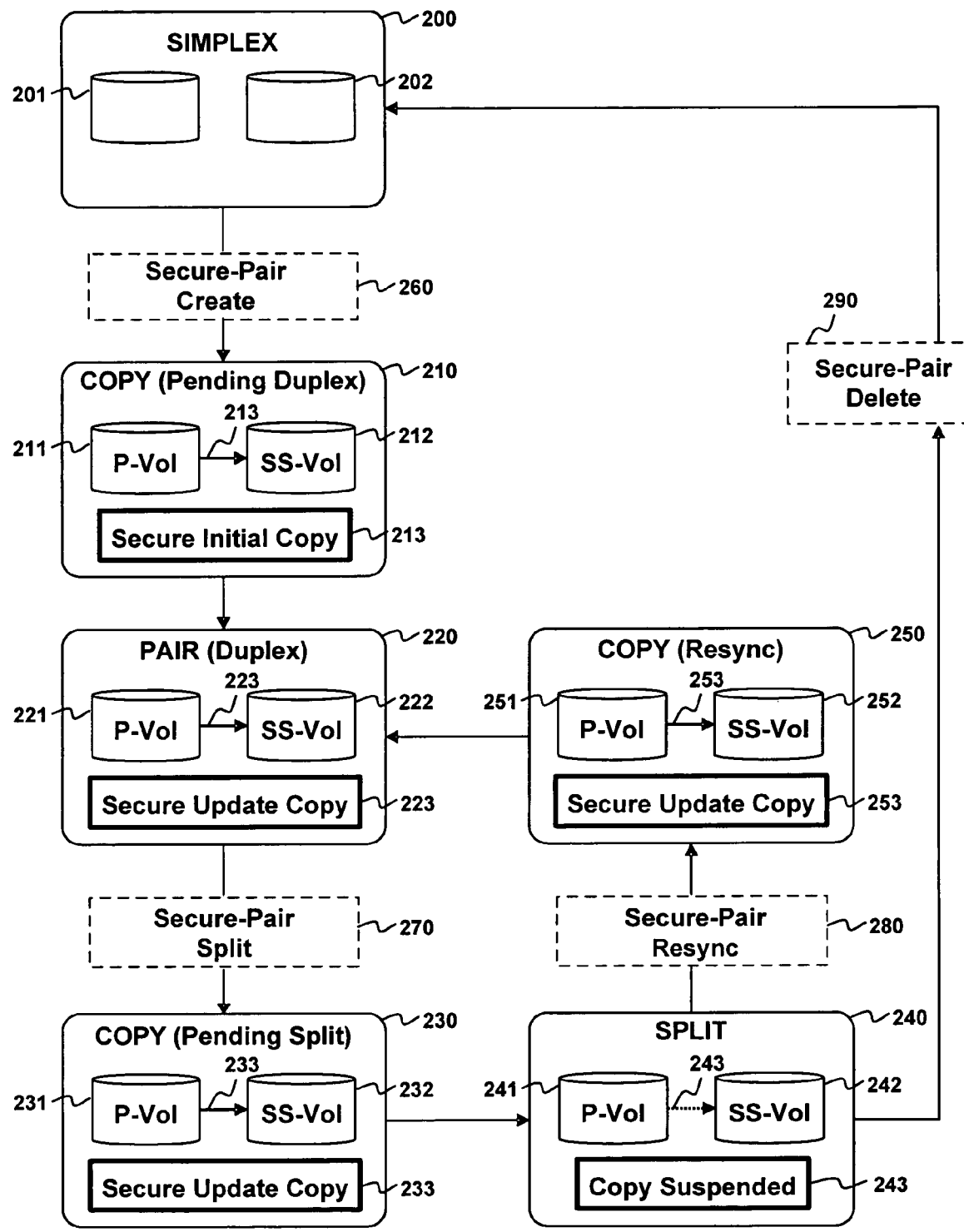
FIG. 4 shows a state transition diagram of various stages of data mirroring according to the present invention.

FIG. 4 is a state transition diagram showing the different operational states of data mirroring according to the present invention. There are six states: SIMPLEX 200, COPY (Pending Duplex) 210, PAIR 220, COPY (Pending Split) 230, SPLIT 240, and COPY (Resync) 250. SIMPLEX state 200, PAIR state 220, and SPLIT state 240 are steady states, while COPY (Pending Duplex) state 210, COPY (Pending Split) 230, and COPY (Resync) state 250 are transitional states. The triggering events (shown in FIG. 4 by dashed lines) for state transitions are data mirroring operations and data mirroring commands which, in accordance with the illustrative embodiment of the present invention of FIG. 1, issue from the hosts 1, 2, 3. The commands include: Secure-Pair Create 260, Secure-Pair Split 270, Secure-Pair Resync 280 and Secure-Pair Delete 290. The arrows show the only valid state transitions in accordance with this particular embodiment of the present invention.

The SIMPLEX state 200 is an operational state where a pair of volumes 201 and 202 are not linked together. In the SIMPLEX state, each volume can be accessed independently by a host. Secure data mirroring in accordance with this embodiment of the present invention must start from the SIMPLEX state.

Secure-Pair Create 260 is a command that initiates secure data mirroring operation in the storage system 20. The volumes 201 and 202 are now referred to as a primary volume 201 (P-Vol) and a secure secondary volume 202 (SS-Vol). This operation is discussed in further detail below.

The COPY (Pending Duplex) state 210 is a transitioning state where a Secure Initial Copy operation 213 is being executed. This state persists until P-Vol 211 and SS-Vol 212 become a duplex (paired), at which time data on the P-Vol is mirrored to the SS-Vol. The Secure Initial Copy operation 213 is discussed in further detail below.

The PAIR state 220 is the state to which the COPY (Pending Duplex) state 210 transitions. The PAIR state 220 is a steady operational state where P-Vol 221 and SS-Vol 222 are duplex. In this state, updates that are made to P-Vol 221 are mirrored to SS-Vol 222 by a Secure Update Copy 223 operation. This operation is discussed in further detail below.

Secure Pair Split 270 is a command that suspends the data mirroring operation in the storage system. This aspect of the present invention is discussed in further detail below.

The COPY (Pending Split) state 230 is a transitional operational state where the Secure Update Copy operation 233 is being executed. This state continues until SS-Vol 232 becomes a consistent image of P-Vol 231 at the time when the Secure Pair Split 270 was executed. More specifically, this state persists until the data on the P-Vol 231 is mirrored to the SS-Vol 232. The Secure Update Copy operation 233 is discussed in further detail below.

The SPLIT state 240 is the state to which the COPY (Pending Split) state 230 transitions. The SPLIT state 240 is the steady state where P-Vol 241 and SS-Vol 242 are split. In the SPLIT state, updates made to the P-Vol 241 are not mirrored to SS-Vol 242. However, such updates are marked in the memory 30 as so-called "differential data" between P-Vol 241 and SS-Vol 242 to be mirrored during a resync operation. This aspect of the present invention is discussed further below.

Secure-Pair Resync 280 is a command that restarts secure data mirroring from P-Vol 211 to SS-Vol 212. In this case, differential data that was accumulated during the SPLIT state is used to perform a secure data mirror operation on data updates made in the P-Vol 211 that occurred during the SPLIT state (the differential data). In this particular embodiment of the present invention, a threshold is provided. If the amount of differential data exceeds the threshold, then the Secure Initial Copy operation 213 is executed. The reason is that enough differential data may accumulate during the SPLIT state that it would be more efficient to perform a dedicated data mirror operation to mirror the entire P-Vol (including the differential data), than to mirror only the differential data as a background operation in a live system. This aspect of the invention is discussed in further detail below.

The COPY (Resync) state 250 is a transitional state where the Secure Update Copy operation 253 is performed on any differential data on the P-Vol 251. This state continues until the P-Vol 251 and the SS-Vol 252 attain a duplex (PAIRED) state, at which time a transition occurs to the PAIR state 220.

Secure-Pair Delete 290 is a command that causes the storage system 20 to delete the secure data mirroring link between the P-Vol 211 and the SS-Vol 212. After the command is executed, the state of the volumes becomes SIMPLEX, where two volumes have no relationship to each other. Unlike the Secure-Pair Split command 270, differential data is not tracked when a pair is split by the Secure-pair Delete command.

In accordance to this particular embodiment of the present invention, any host can access the SS-Vol in any of the foregoing operational states. However, it will be clear that only those hosts that have an appropriate decryption key can obtain clear data from the SS-Vol. Other hosts will be able to read data from the SS-Vol, but will received garbled and otherwise unintelligible information instead of clear text. It is understood of course, that the primary host can read or write data to the P-Vol in any of the foregoing states.

Figure 5:
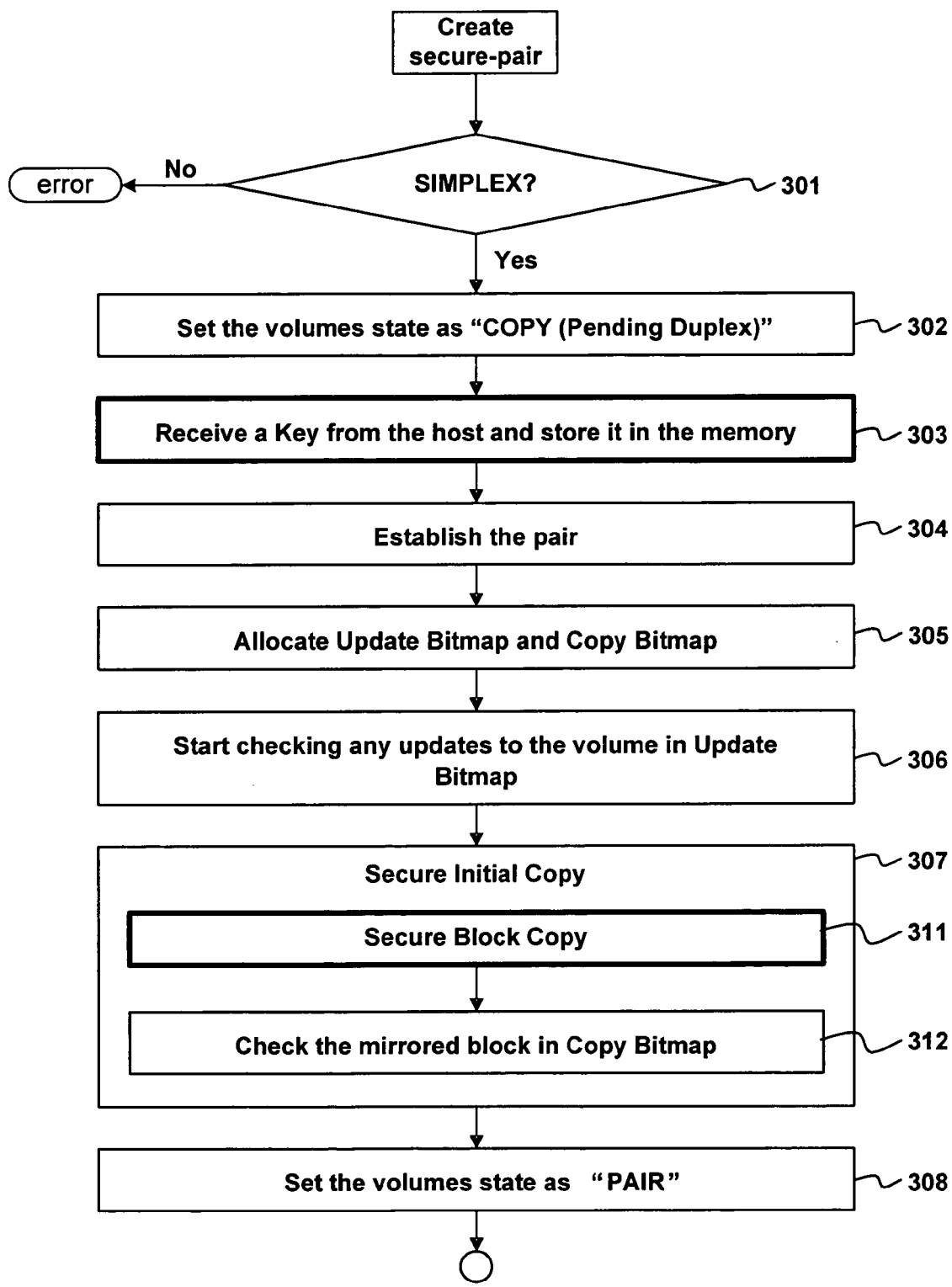
FIG. 5 is a high level flow diagram highlighting processing steps for creating a data mirror pair according to an embodiment of the present invention.

FIG. 5 shows a process flow of the secure data mirroring when the Secure-Pair Create command 260 is executed, according to this particular embodiment of the present invention. A host, referred to as the primary host, will issue a Secure-Pair Create command when data mirroring of its associated volume is desired. The Secure-Pair Create command specifies two volumes, the volume associated with the primary host (the primary volume) and a volume that is the target of the data mirroring operation (the secondary volume).

A check is performed in a step 301 to confirm that the two volumes each is in the SIMPLEX state 200. If either or both of the two volumes are not in the SIMPLEX state, then appropriate error processing is performed because a duplex state cannot be attained for the data mirroring operation. If the two volumes are in the SIMPLEX state, then the volumes are set to the COPY (Pending Duplex) state 210 in a step 302.

In a step 303, a key is received from primary host and is stored in the key region 32 of the memory 30. This aspect of the present invention is discussed in further detail below. In a step 304, the process establishes a secure data mirroring pair between the two volumes. In FIG. 4, the volume 201 is defined as the P-Vol 211 and the volume 202 is defined as the SS-Vol 212. Typically, a volume is associated with volume attribute information. This information includes an indication that the volume is being used as a primary volume, or a secondary volume. When a secure data mirroring pair is established between the two volumes that are specified in connection with the Secure-Pair Create command, the volume attribute of one of the volumes is set to indicate that it is a primary volume (P-Vol) and the volume attribute of the other volume is set to indicate that it is a secure secondary volume (SS-Vol).

Since the data mirroring operation occurs in real time, it is important to ensure consistency between the primary and the secondary volumes. A conventional approach is the use of bitmaps for tracking the various states of each data block in the primary volume. Thus, in a step 305, the process allocates two bitmap tables in the bitmap region 31 of the memory 30: an Update Bitmap (FIG. 7) and a Copy Bitmap (FIG. 8).

The Update Bitmap indicates for each block in the P-Vol whether that block was updated by the primary host since the last data mirroring operation. FIG. 7 is an example of the Update Bitmap. The figures shows in tabular form an array of 8 columns by N rows to accommodate 8×N blocks, each block having a corresponding entry (bit) in the Update Bitmap. A "0" can be used to indicate that the corresponding block has not been updated since it was last mirrored. A "1" would then indicate that the corresponding block was updated since the last time it was mirrored. Basically then, each time a block is written to, its corresponding bit in the Update Bitmap is set to "1".

The Copy Bitmap indicates for each block in the P-Vol whether it has been mirrored to the SS-Vol. FIG. 8 shows an example of the Copy Bitmap. Each entry (bit) in the bitmap indicates the mirrored state of its corresponding block; a "0" indicates that the block has been mirrored, and a "1" indicates the block has not yet been mirrored. Thus, when the Copy Bitmap is allocated in response to the Secure-Pair Create command, it is initialized to all "1"s. It can be appreciated that other techniques for data consistency can be implemented.

As will be explained, in accordance with this particular embodiment of the present invention, the blocks are mirrored in sequential order. Thus, the Copy Bitmap is scanned beginning from row 1, column 1 in increasing sequential order. Referring to FIG. 8, the bit 411 is next in line to be mirrored to the SS-Vol. However, if the process receives an update request on a block that has not yet been mirrored, then the process will jump to the requested block to perform a data mirror operation in accordance with the present invention on the data that is already contained in that block before servicing the update request in order to maintain data consistency. Sequential processing then resumes where it left off, in this case the block identified by bit 411. Additional examples are shown in FIGS. 7 and 8. For example, bit 402 in FIG. 7 and bit 412 in FIG. 8 indicate that the corresponding block was updated out of sequence. See also bits 403 and 413, and 404 and 414.

Returning to FIG. 5, in a step 306, at this point the process begins tracking updates that are made to the primary volume.

In a step 307, a loop constituting the Secure Initial Copy operation shown in FIG. 4 is performed for each block on the P-Vol. Processing of the loop establishes a point in time. As an initial operation, every block in the P-Vol prior to that point in time is mirrored to the SS-Vol in accordance with the present invention. The Secure Block Copy operation as shown in FIG. 2 is performed for each such block, in a step 311. When a block has been mirrored, its corresponding entry in the Copy Bitmap is set to "0" (step 312) to indicate the block has been mirrored to the SS-Vol. The process continues until all the blocks have been mirrored. When all blocks have been mirrored, the P-Vol and the SS-Vol are set to the PAIR state 220 in a step 308.

In this particular embodiment of the present invention, all mirrored blocks are processed by the Secure Block Copy operation shown in FIG. 2. However, it can be appreciated that in another embodiment of the present invention, some hosts may not be configured to use secure data mirroring. Consequently, some of the mirrored blocks may not be encrypted. In such a case, an additional bitmap that tracks un-encrypted blocks and encrypted blocks, or other similar tracking mechanism, would be needed to identify which blocks are encrypted and which blocks are not encrypted.

Figure 6:
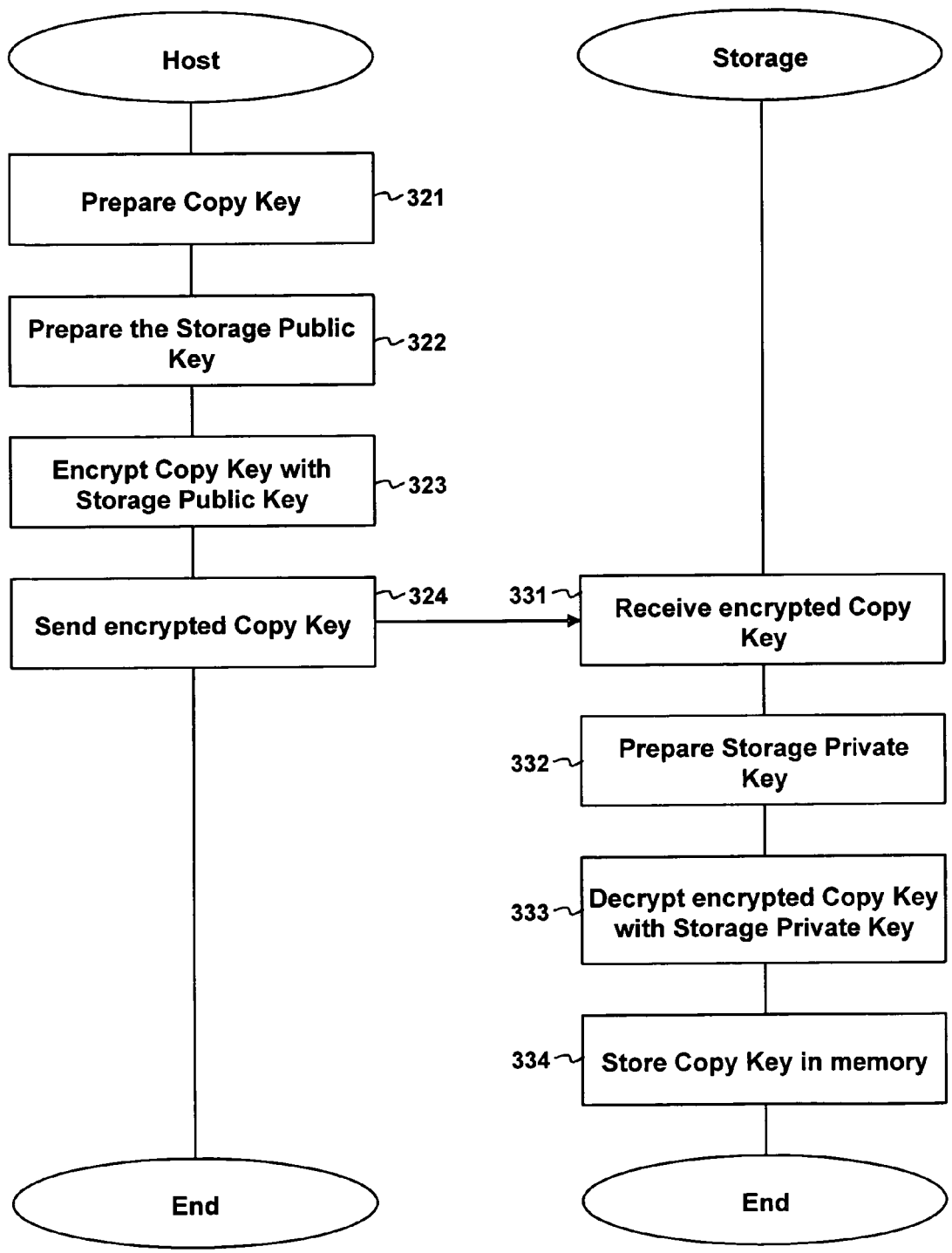
FIG. 6 highlights the processing for obtaining a copy key in preparation for creating a data mirror pair according to an embodiment of the present invention.

Refer now to FIG. 6 for an example of a key exchange process (step 303, FIG. 5) adapted according to a particular illustrative embodiment of the present invention. This particular key exchange process is currently being discussed by the ANSI/T11.3 committee, for using FC-SP (Fibre Channel Security Protocols) including a key exchange protocol within SAN as discussed, for example, on page 52 of the document available at the web site:
http://www.snia.org/education/tutorials/spr2004/security/
Security_for_Storage_Networks.pdf Continuing with FIG. 6, in a step 321 the host accesses a Copy Key that is associated with the host. This key will be used in the Secure Block Copy operation illustrated in FIG. 2. This step can be triggered by the host itself, when data mirroring is to be initiated. Alternatively, the triggering mechanism can be another host, such as a service processor, or the storage system 20.

In a step 322, the host obtains a Storage Public Key. The Storage Public Key is one of a pair of keys (public-key/private-key) generated according to a public key encryption method. The matching key is stored in the storage system 20, and is referred to as the Storage Private Key. There are several ways to obtain a public key. A common way is to obtain a public key from a CA (certification Authority). Another way is to install the public key to the host statically beforehand.

In a step 323, the host encrypts its Copy Key by applying the Storage Public Key it obtained in step 322. The result is an Encrypted Copy Key that cannot be practicably decrypted except by applying the Storage Private Key. In a step 324, the Encrypted Copy Key is communicated to the storage system 20. Since the Copy Key is in encrypted form, any suitable form of unsecured data transmission can be used without concern for breach of security.

In a step 331, the storage system 20 receives the Encrypted Copy Key. In a step 332, the storage system obtains its Storage Private Key and uses it to decrypt the Encrypted Copy Key (step 333) to recover the Copy Key. Then, in a step 334 the storage system 20 stores the recovered Copy Key in the key region 32 of its memory 30 during the time that data mirroring is in effect. In a particular implementation of this aspect of the present invention, the world wide name (WWN) that is associated with the host HBA can be used as an index for storing the recovered Copy Keys. The WWN facilitates the lookup (search) process for finding the Copy Key associated with a host.

It can be appreciated of course that a common-key encryption technique can be used instead of the public key encryption system discussed above. In a common-key system, the host and the storage system 20 use the same key; the host uses the key for encryption, the storage system uses the key for decryption. The challenge of using a common-key system is to ensure a secured conveyance of the key to both the host and to the storage system.

The storage system 20 handles secure data mirroring for many hosts and many volumes. Consequently, many keys from many hosts will be stored in the key region 32 of the memory 30. The key management function 50 (FIG. 1) serves to match a host with the proper key from among potentially many keys for a given data mirroring operation.

Figure 9:
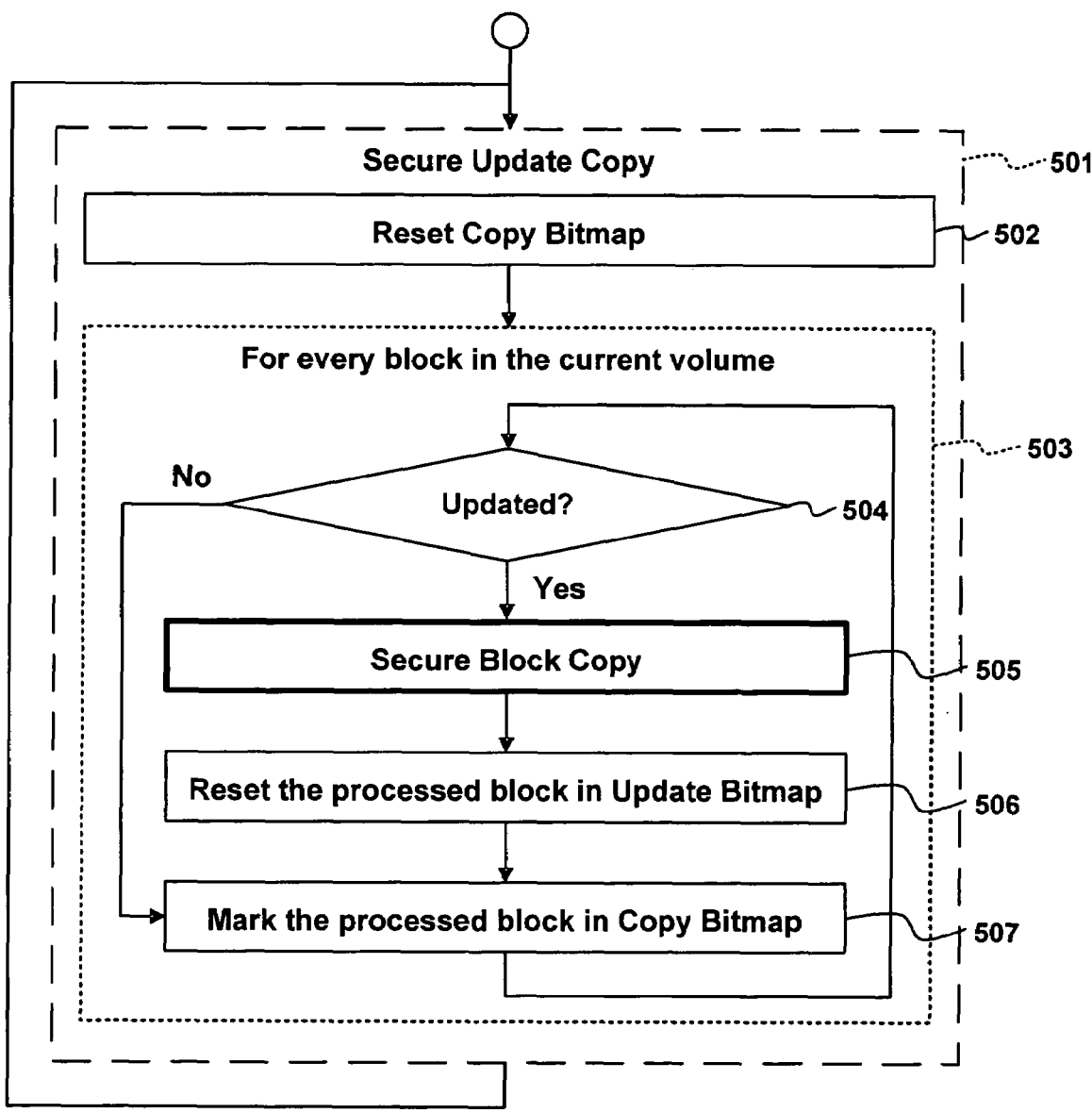
FIG. 9 is a high level flow diagram highlighting processing steps for update copying of a data mirror pair according to an embodiment of the present invention.

Referring now to FIG. 9, the Secure Update Copy operation shown in FIG. 4 is described. The Secure Update Copy operation is periodically executed in a loop 501 as long as the volumes are in a PAIR state 220. The loop period can be any suitable length of time. Each iteration can be initiated automatically. For example, if the disk controller is implemented under UNIX, the "cron" facility in the UNIX operating system can be configured for continuous operation of the Secure Update Copy process. Each iteration of the loop 501 comprises the following steps: an initialization step 502 and an inner loop 503.

In the step 502, the process resets the Copy Bitmap to all "1"s to indicate that none of the corresponding blocks have been mirrored.

The loop 503 is executed to process each block in the P-Vol. As noted above, the blocks are processed in sequence (the sequentially processed blocks) beginning with the block corresponding to row 1, column 1 of the Copy Bitmap shown in FIG. 8. However, blocks that are updated during the processing of the loop 501 are preferentially processed. These blocks are mirrored ahead of the sequentially processed blocks.

Each iteration of the loop 503 includes checking an entry in the Update Bitmap in a step 504 to determine if the corresponding block has been updated. If not, then there is no need to perform a mirroring operation, and processing proceeds to a step 507. At step 507, the corresponding entry in the Copy Bitmap is set to "0" to indicate that data mirroring of the corresponding block has been processed (although in this case, of course, no data mirroring was actually performed).

If, in step 504, the corresponding block has been updated, then in a step 505 a Secure Block Copy operation (FIG. 2) is performed. Then, in a step 506 the entry in the Update Bitmap is set to "0" to indicate that the block has not been updated since its last mirroring operation (which was just performed). Processing proceeds to step 507 where the corresponding entry in the Copy Bitmap is set to "0" to indicate that data mirroring of the corresponding block has been performed. Execution, then proceeds with the next iteration of the loop 503 to process the next entry in the Update Bitmap.

Figure 10:
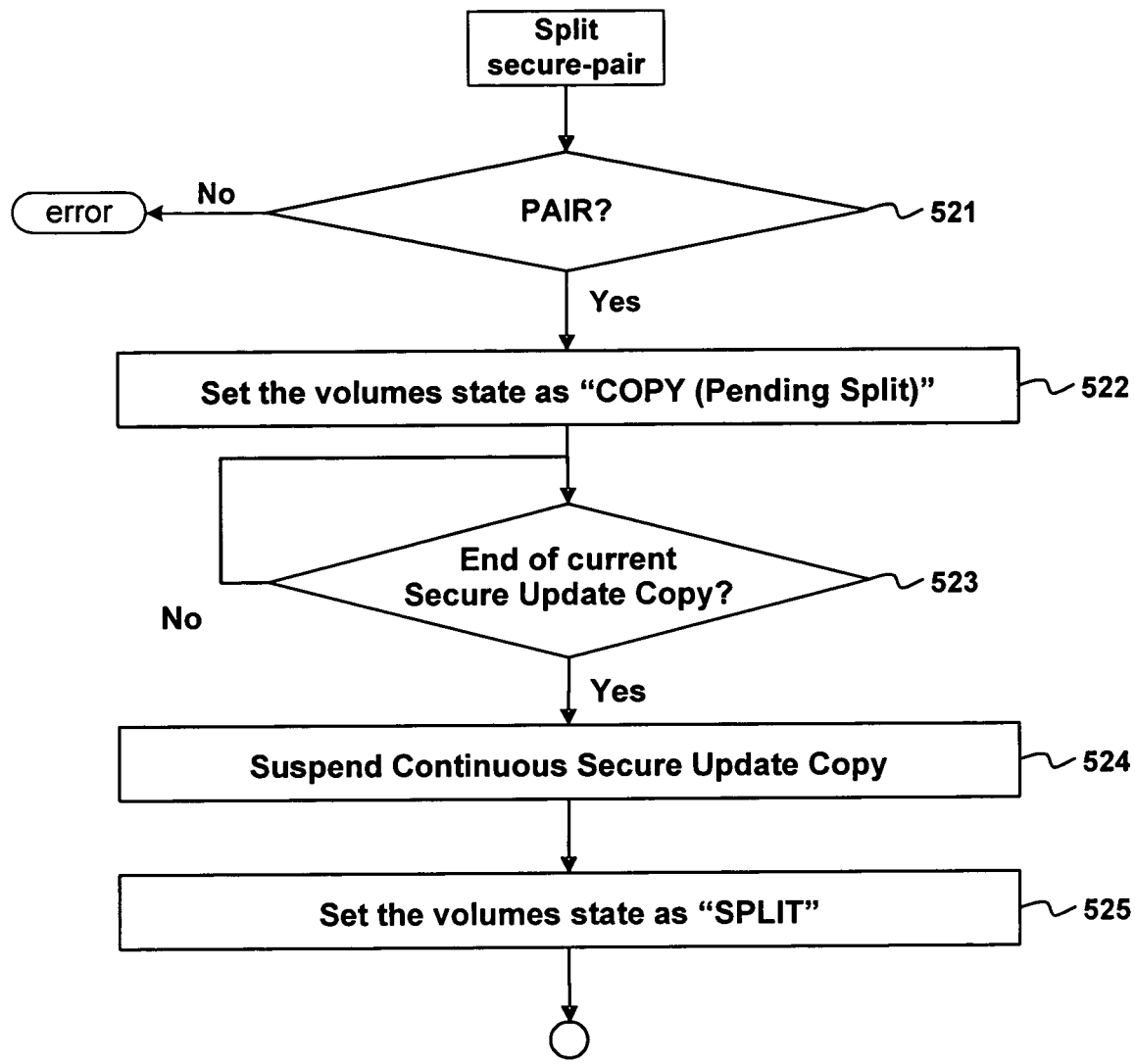
FIG. 10 is a high level flow diagram highlighting processing steps for splitting a data mirror pair according to an embodiment of the present invention.

FIG. 10 shows the processing for a Secure-Pair Split command 270 according to the particular embodiment of the present invention shown. In a step 521, the process checks the current state of the volumes specified in the Secure-Pair Split command 270. In FIG. 4, the volume 221 and the volume 222 are specified as the target of the Secure-Pair Split command 270. If the volumes are not in the PAIR state 220, then appropriate error processing is performed. If the volumes are in the PAIR state 220, then the process proceeds to a step 522 where the volumes are set to the COPY (Pending Split) state 230. The process waits in a loop 523 until the current processing of the Secure Update Copy process is complete. Upon completion of the Secure Update Copy process, the SS-Vol will consistent with the P-Vol with respect to a given point in time relating to receipt of the Secure-Pair Split command. In a step 524, the process suspends the Secure Update Copy process. The state of the volumes is set to the SPLIT state 240.

In the SPLIT state, the P-Vol 241 accepts updates from the host. However, the updates will not be mirrored to the SS-Vol 242. Instead, the updates are tracked by setting the corresponding entry (bit) in the Update Bitmap to "1". The Copy Suspended function 243 just indicates this state. The function performs updates to the Update Bitmap.

Figure 11:
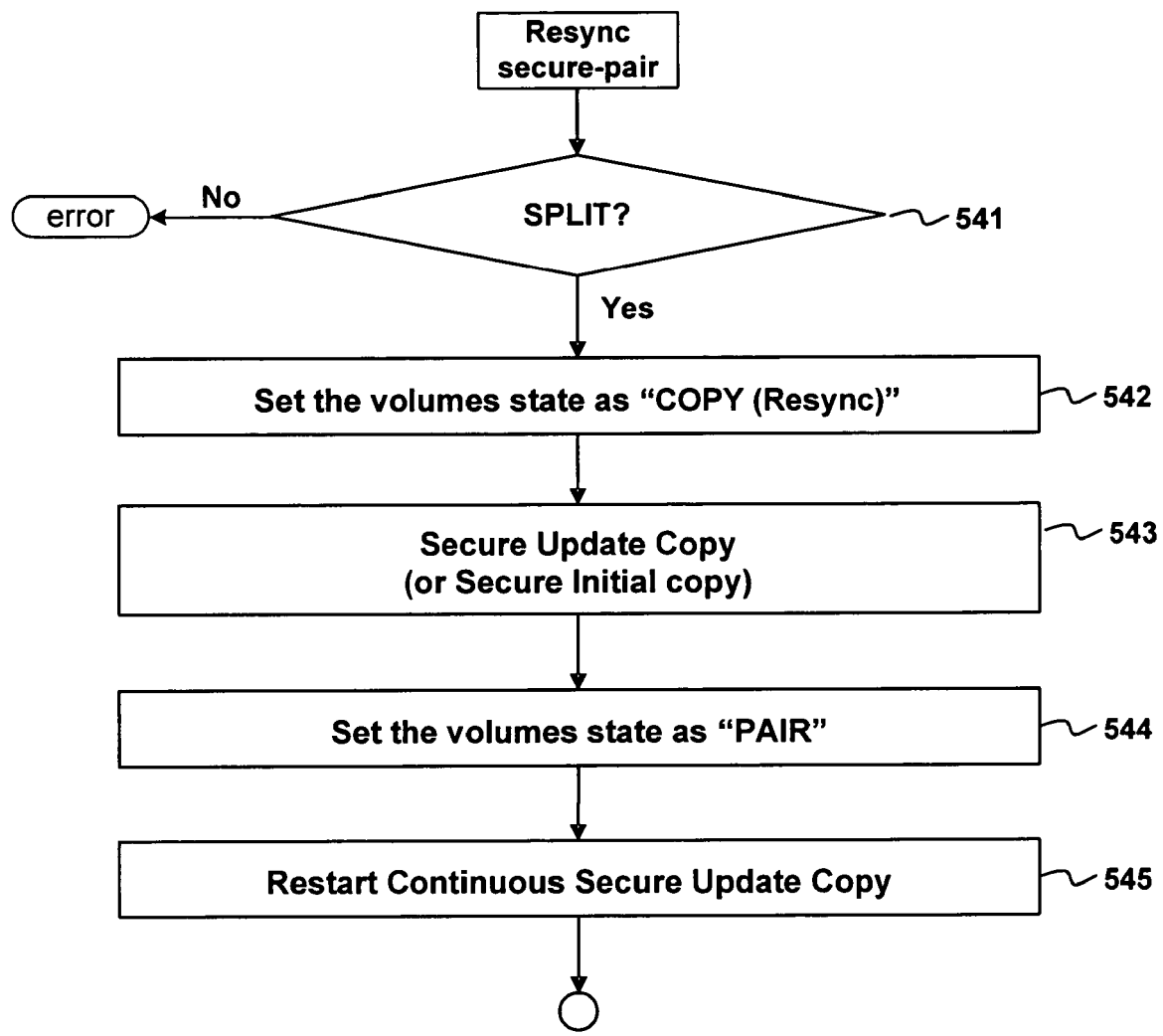
FIG. 11 is a high level flow diagram highlighting processing steps for performing a copy resync operation on a data mirror pair according to an embodiment of the present invention.

FIG. 11 shows a process flow for the Secure-Pair Resync command 280 according to the particular embodiment of the present invention shown. In a step 541, the process checks the current state of the volumes specified in connection with the Secure-Pair Resync command 280. In FIG. 4, the volume 241 and the volume 242 are specified as the target of the Secure Pair Resync command 280. If the volumes are not in the SPLIT state 240, then appropriate error processing is performed. If the volumes are in the SPLIT state 240, then the process proceeds to a step 542 where the volumes are set to the COPY (Resync) state 250.

In a step 543, the process executes an iteration of the Secure Update Copy operation discussed in FIG. 9. In a particular implementation of this embodiment of the present invention, a threshold can be applied to the Update Bitmap to make a determination whether to perform an iteration of the Secure Update Copy operation or a Secure Initial Copy operation (loop 307, FIG. 5). If "most" of blocks in the P-Vol have been updated after entering the SPLIT state, it might be more efficient to simply data mirror all of the blocks on the P-Vol (via Secure Initial Copy), rather than perform the incremental data mirroring of the Secure Update Copy process. Thus, a predetermined number of bits that are set to "1" in the Update Bitmap can be used as a threshold, above which the Secure Initial Copy operation is performed.

In a step 544, the operational state of the volumes is set to the PAIR state 220 after the Secure Update Copy or the Secure Initial Copy has completed. Then, in a step 545, the Secure Update Copy operation is set up for continuous operation. As discussed above in FIG. 9, this can be implemented, for example on UNIX, using the "cron" facility.

Figure 12:
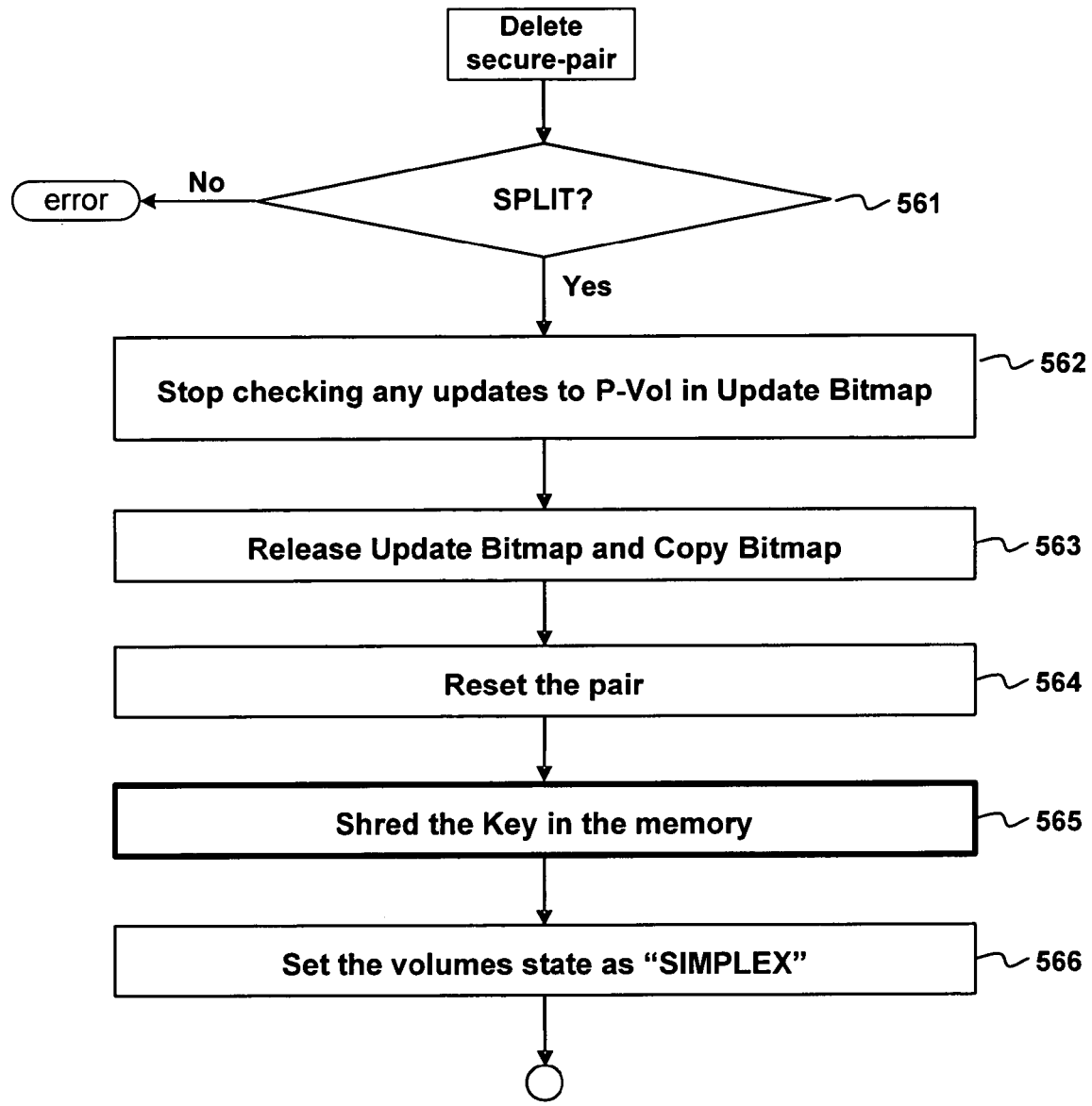
FIG. 12 is a high level flow diagram highlighting processing steps for deleting a data mirror pair according to an embodiment of the present invention.

FIG. 12 shows a process flow for the Secure-Pair Delete command 290 according to the particular embodiment of the present invention shown. In a step 561, the process checks the current state of the volumes specified in connection with the Secure-Pair Delete command. In FIG. 4, the volume 241 and the volume 242 are specified as the target of the Secure-Pair Delete command 290. If the volumes are not in the SPLIT state 240, then appropriate error processing is performed. Alternatively, commands can be issued to move the operational state of the specified volumes to the SPLIT state instead of generating an error indication.

Continuing with FIG. 12, if the volumes are in the SPLIT state 240, then the process proceeds to a step 562. The process can cease updating bit entries in the Update Bitmap since secure data mirroring is going to be terminated by this command. Likewise, in a step 563, the Update Bitmap and the Copy Bitmap are deallocated and returned to the memory 30.

In a step 564, the process resets the volume pair. In the memory 30, the volume 241 was registered as a P-Vol and the volume 242 was registered as an SS-Vol. In response to the Secure-Pair Delete command, the volume P-Vol is no longer identified as a primary volume. As discussed above in FIG. 5, the volume attribute information associated with the P-Vol can be set to indicate that it is no longer a primary volume. In accordance with the present invention, however, the SS-Vol maintains its identity as a secure secondary volume. By maintaining the status of the volume 242 as a secure secondary volume even after secure data mirroring has ceased, the system can still recognize that the volume contains encrypted data. In this way, as will be explained below, appropriate processing can be applied to access the encrypted data that is stored on the SS-Vol.

In a step 565, the key that was used to perform the Secure Block Copy operation (FIG. 2) is deleted from the key region 32 in the memory 30. Then, in a step 566 the process sets the state of the volumes to the SIMPLEX state 200.

Figure 13:
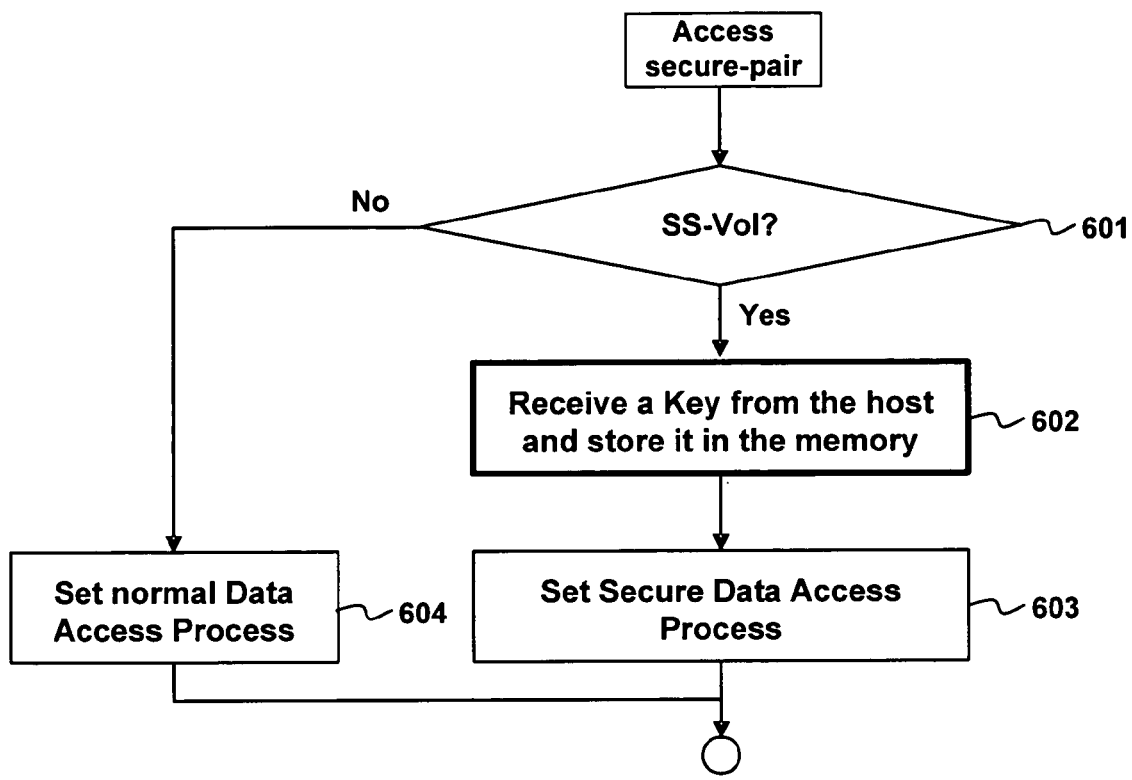
FIG. 13 is a high level flow diagram highlighting processing steps for accessing a data mirror pair according to an embodiment of the present invention.

Referring to FIG. 13, the discussion will now turn to accessing a secure secondary volume in accordance with the foregoing disclosed embodiment of the present invention. When a logical volume is attached to a logical channel and is ready for data access by a host, the following processing is performed in addition to the processing conventionally performed during an "attach" operation:

In a step 601, a check of the volume attribute information is made to determined if the volume is a secure secondary volume (SS-Vol). If the volume attribute information indicates that the volume is not an SS-Vol, then the process proceeds to a step 604 to perform conventional data access operations.

If the volume is an SS-Vol, then in a step 602 a Copy Key is obtained from the host and is stored in the key region 32 in the memory 30. An illustrative embodiment of this aspect of the present invention is discussed above in connection with FIG. 6. The storage system 20 handles secure data access for many hosts and many volumes. Consequently, many keys from many hosts will be stored in the key region 32. The key management function 50 serves to match a host with the proper key for a given secured data access.

Then, in a step 603, secure data access processing is performed for subsequent data access requests from the host. Data accesses proceed according to the Secure Data Access process shown in FIG. 2. The Copy Key that is obtained from the host is used to decrypt the encrypted data blocks that are read out from the SS-Vol.

Another aspect of the present invention is a write operation to the secure secondary volume (SS-Vol). The host can write data to the SS-Vol, as long as the SS-Vol is in the of SIMPLEX state or the SPLIT state. When the host issues a write operation to the SS-Vol, the data block associated with the write operation is encrypted using the Copy Key that was obtained from the host. The resulting encrypted data block is then stored in the location on the SS-Vol that is identified in the write operation.

A Secure Reverse Resync command can be issued to the SS-Vol when it is in the SPLIT state. This will perform a data mirroring operation in the direction from the SS-Vol to the P-Vol. Moreover, since the data blocks in the SS-Vol are stored in encrypted form and the data blocks in the P-Vol are in clear-text form (i.e., not encrypted), the reverse data mirroring operation includes a step of decrypting the encrypted data block to produce a clear data block. The clear data block is then mirrored to the P-Vol.

It can be appreciated that in a variation of this embodiment of the present invention, write operations to the SS-Vol can be performed without encryption (a separate bitmap would be needed to distinguish encrypted blocks and unencrypted blocks). In such a case, conventional reverse resync processing can be performed to mirror updates made in the SS-Vol to the P-Vol; i.e., there is no step of decrypting. Data reads of the SS-Vol, of course, require decryption as discussed above.

Figure 14:
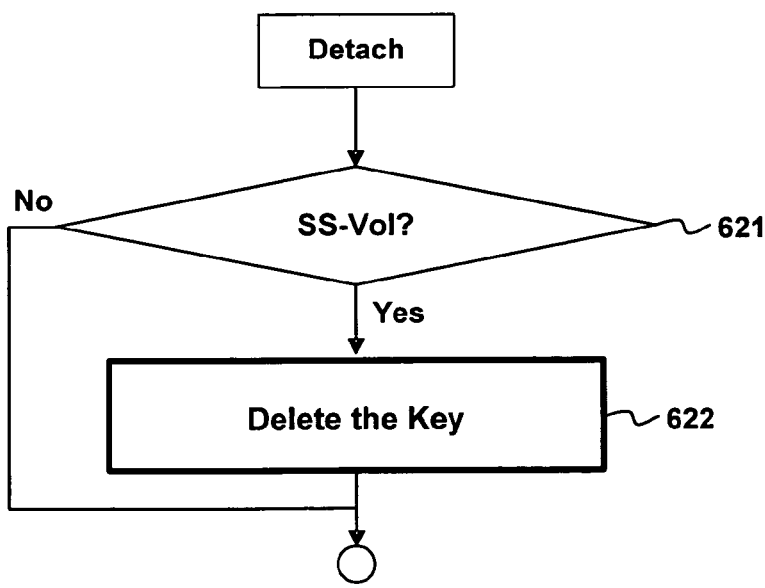
FIG. 14 is a high level flow diagram highlighting processing when a logical volume is no longer accessible by a host according to an embodiment of the present invention.

Referring to FIG. 14, when a logical volume is detached from its logical channel, additional processing is required when the logical volume is a secure secondary volume (SS-Vol). In a step 621, a check of the volume attribute information associated with the logical volume that is being detached is made to determine if the volume is an SS-Vol. If the logical volume is an SS-Vol, then its associated Copy Key in the key region 32 of the memory 30 is deleted.

Additional mirroring options can be included as further aspects of the present invention:

1) Secure Consistency Group

Users can define consistency groups in which several secure volume pairs move among the different operational states (FIG. 4) at the same time. As a result, several SS-Vols can contain time consistent images. Within the group, the same Copy Key might be used.

In another embodiment, a consistency group contains both conventional un-secured volume pairs and secure volume pairs per the present invention. The consistency group could include a table in which the attribute of each volume pair is managed. This would allow for data mirror operations to proceed for both kinds of volumes, simply by referring to the attributes.

2) Secure Cascade Mirroring and Secure Multi-Target Mirroring

Cascade mirroring is a multistage mirroring method in which multiple secondary volumes are arranged to perform data mirroring in cascaded fashion where each secondary volume performs data mirroring to a succeeding secondary volume. Secure Cascade Mirroring is a multistage mirroring method in which any of the secondary volumes in the cascade can be a secure secondary volume. If a volume of a stage becomes SS-Vol, all volumes cascaded after the stage keep encrypted data. The steps described above in connection with FIG. 13 can be used to access these volumes.

Multi-Target Mirroring is a data mirroring technique in which data in a primary volume is targeted to multiple secondary volumes. A Secure Multi-Target Mirroring technique according to the present invention allows for one or more of the target volumes to be a secure secondary volume.

A variation of the foregoing techniques is a combination of cascade and multi-target data mirroring.

3) Quick Operations

So-called "quick" operations execute mirroring function such as Pair Split, Pair Resync, and Pair Restore on the fly; i.e., the SS-Vol is immediately available because the differential data copy is performed as a background process. These operations are also available as long as the operations follow the Secure Block Copy process described in FIG. 2.

In accordance with the foregoing illustrative embodiment of the present invention, each host 1, 2, 3 obtained a Copy Key (e.g., by generating it or otherwise creating it) that was associated with that host, and communicated the Copy Key to the storage system 20. In accordance with another illustrative embodiment of the present invention, the Copy Keys can created (or otherwise obtained) by the storage system 20, and stored and maintained in the storage system. This particular embodiment of the present invention will now be described.

Figure 15:
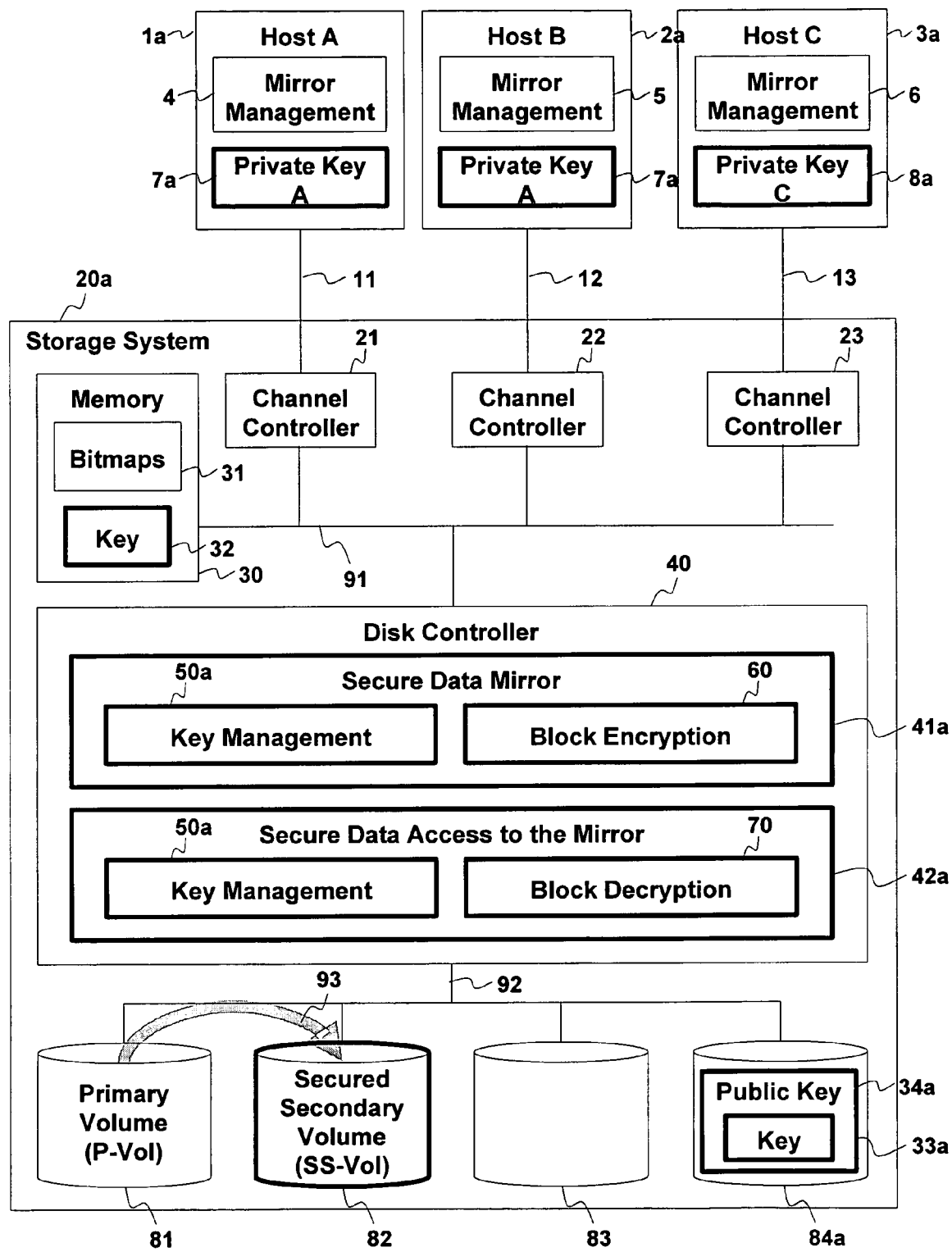
FIG. 15 is a block diagram showing a configuration of a storage system according to another illustrative embodiment of the present invention.

Referring to FIG. 15 then, a storage system 20a according to one such embodiment of the present invention is shown. The keys are created (or otherwise obtained) and stored in the storage system 20a and so they are protected by the RAID architecture. On the other hand, there is a risk that the copy keys are exposed to other hosts or users who may also be able to gain access the storage system, whether with authorization to access to other areas of the storage system or via unauthorized access such as by hackers.

In accordance with this aspect of the invention, a plurality of Copy Keys 33a are stored in a specific volume 84a in the storage system 20a. The Copy Keys 33a are stored in encrypted form. In particular embodiment shown in FIG. 15, a public key encryption technique is used. A plurality of Public Keys 34a are stored in the volume 84a and are used to encrypt the Copy Keys 33a. The corresponding Private Keys 7a are stored in the hosts 1a, 2a, 3a. Each host has its own Private Key 7a. Thus, though the Copy Keys 33a are stored in a storage system that is potentially accessible by others, the keys are nonetheless secured by the public key encryption system.

Figure 16:
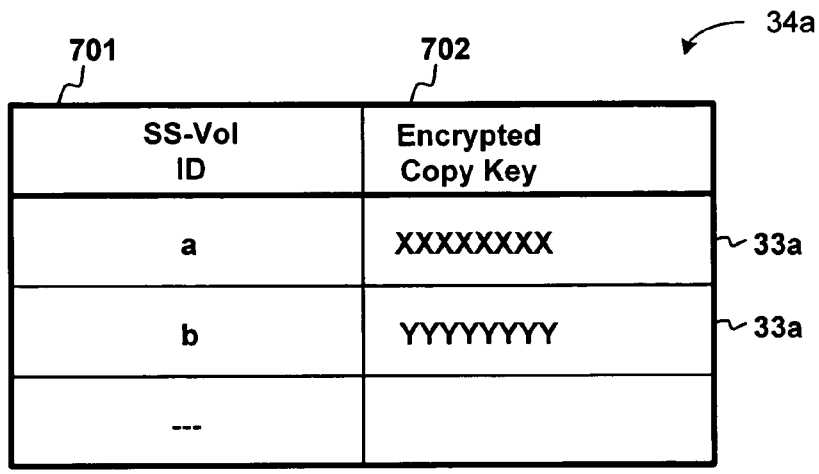
FIG. 16 illustrates how Copy Keys can be managed in accordance with the embodiment of the present invention shown in FIG. 15.

FIG. 16 shows how the encrypted Copy Keys 33a are managed by the key management function 50a. A table 34a is provided with an entry for each secure secondary volume (SS-Vol). An identification field 701 identifies the particular SS-Vol. The Copy Key 33a associated with an SS-Vol is stored in encrypted form in a key field 702. In another embodiment, the Copy Keys 33a can be stored on other media such as IC card, as a backup. Additional redundancy can be provided by maintaining the Copy Keys in IC cards in addition to storing them in a volume 84a.

When a secure data mirroring operation is performed, the host will communicate its Private Key 7a to the storage system 20a, which will be discussed in further detail below. The storage system 20a then retrieves the encrypted Copy Key 33a that is associated with the SS-Vol that is the target of the secure data mirroring operation. The Private Key received from the host is then applied to the retrieved encrypted Copy Key to produce a clear-form of the Copy Key. The decrypted Copy Key is then used in the manner discussed above in connection with the data mirroring operation of the present invention.

Figure 17:
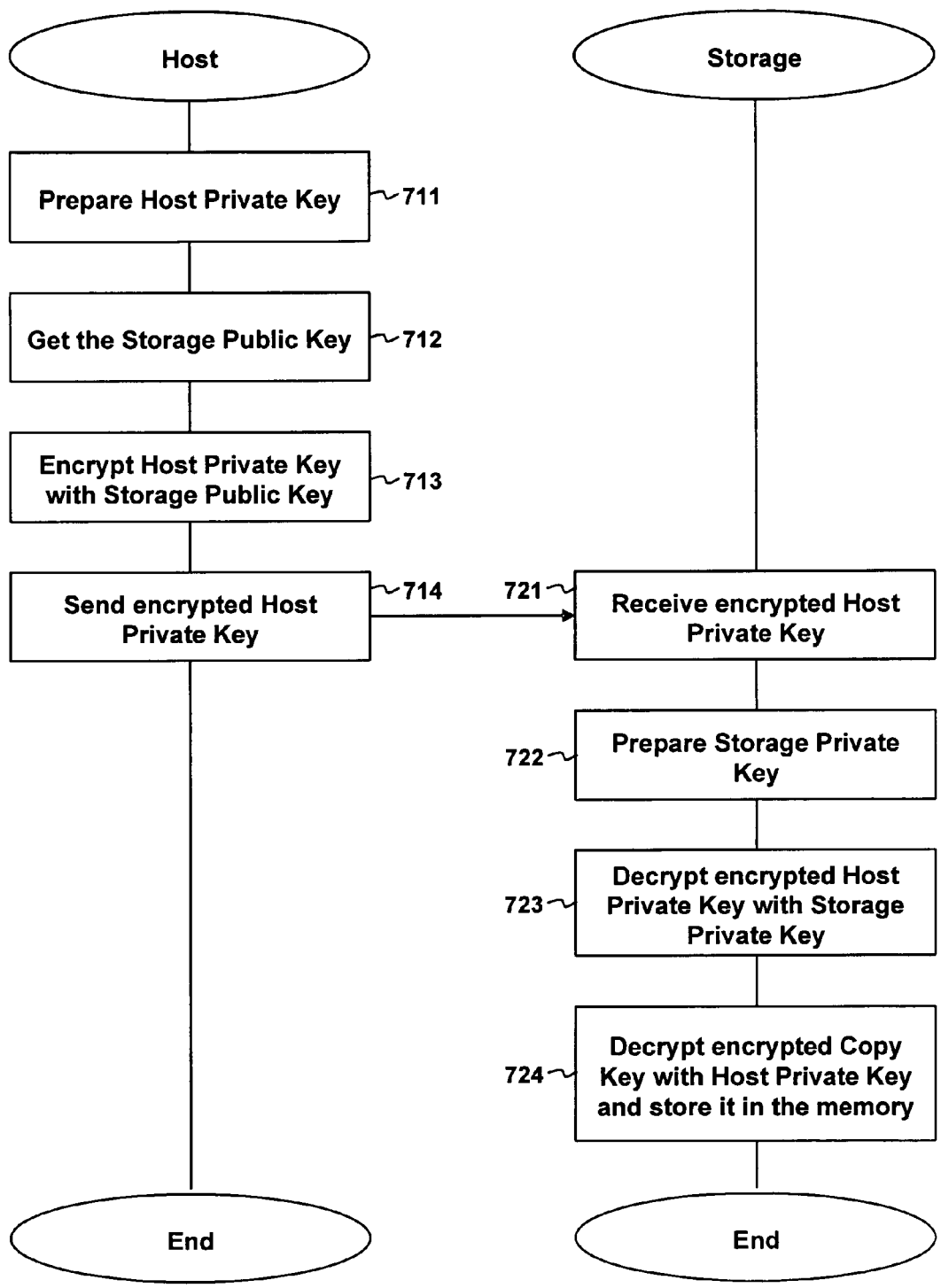
FIG. 17 illustrates how Copy Keys can be decrypted in accordance with the embodiment of the present invention shown in FIG. 15.

FIG. 17 shows the flow for producing the clear form of the Copy Key in accordance with this embodiment of the present invention. In a step 711, the host obtains its own Private Key 7a. This step can be triggered by the host itself, when data mirroring is to be initiated. Alternatively, the triggering mechanism can be another host, such as a service processor, or the storage system 20a.

In a step 712, the host obtains a Storage Public Key. The Storage Public Key is one of a pair of keys generated according a public key encryption method. The matching key is stored in the storage system 20a, and is referred to as the Storage Private Key. There are several ways to obtain a public key. A common way is to obtain a public key from a CA (certification Authority). Another way is to install the public key to the host statically beforehand. Still other ways to obtain a public key can be contemplated, but are not relevant to the present invention.

In a step 713, the host encrypts its Private Key by applying the Storage Public Key it obtained in step 712. The result is an Encrypted Private Key that cannot be practicably decrypted except by applying the Storage Private Key. In a step 714, the Encrypted Private Key is communicated to the storage system 20a. Since the host Private Key is in encrypted form, any suitable form of unsecured data transmission can be used without concern for breaches of security.

In a step 721, the storage system 20a receives the Encrypted Private Key. In a step 722, the storage system obtains its Storage Private Key and decrypts the Encrypted Private Key (step 723) to recover the Private Key. Then in a step 724, the storage system 20a decrypts the encrypted Copy Key using the host Private Key and stores the Copy Key in the key region 32 of memory 30. The key region 32 can be protected against unauthorized access to ensure the security of the Copy Key.

Figure 15A:
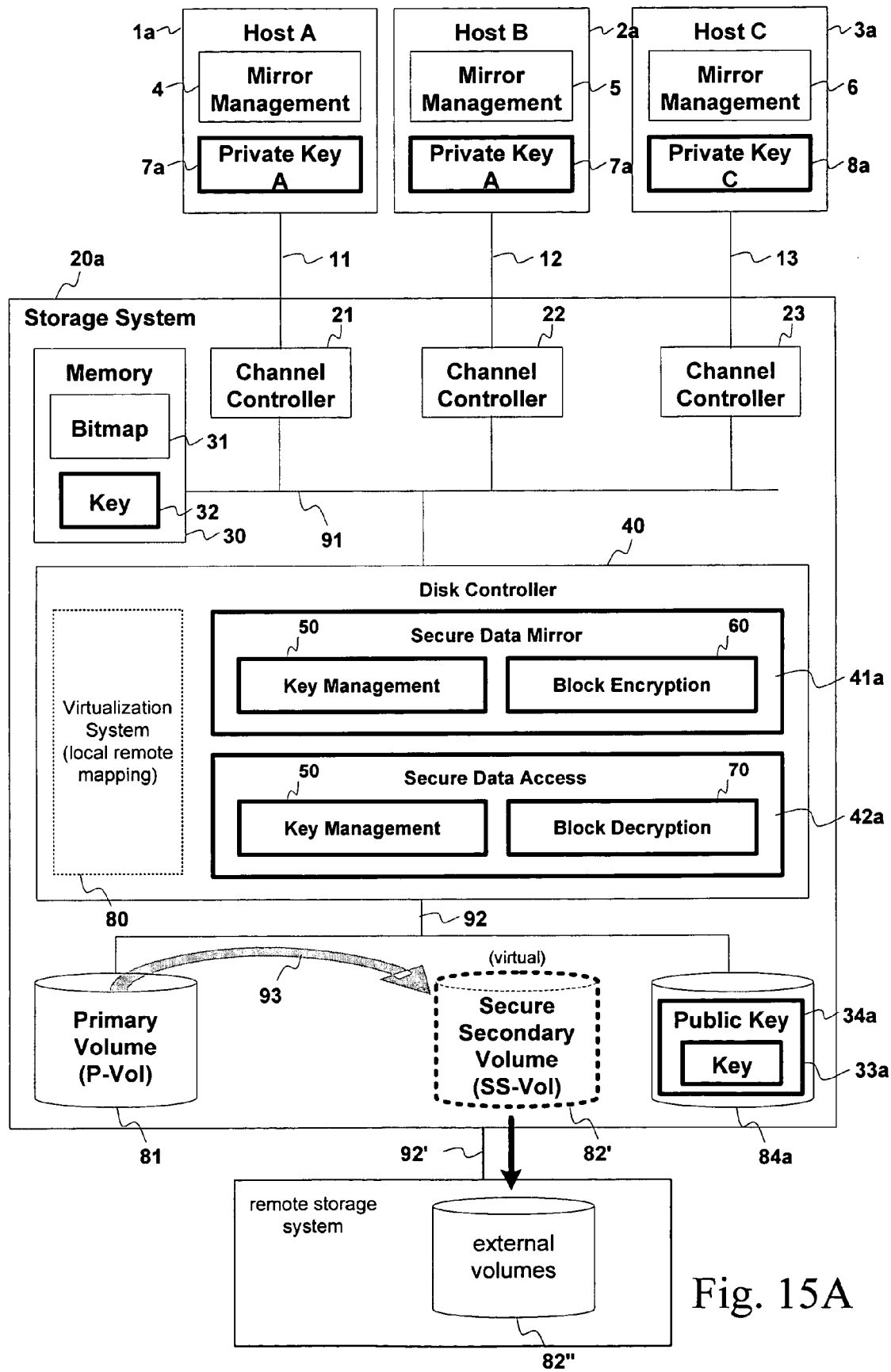
FIG. 15A is a block diagram showing an alternative configuration of a storage system according to the present invention.
Figure 15B:
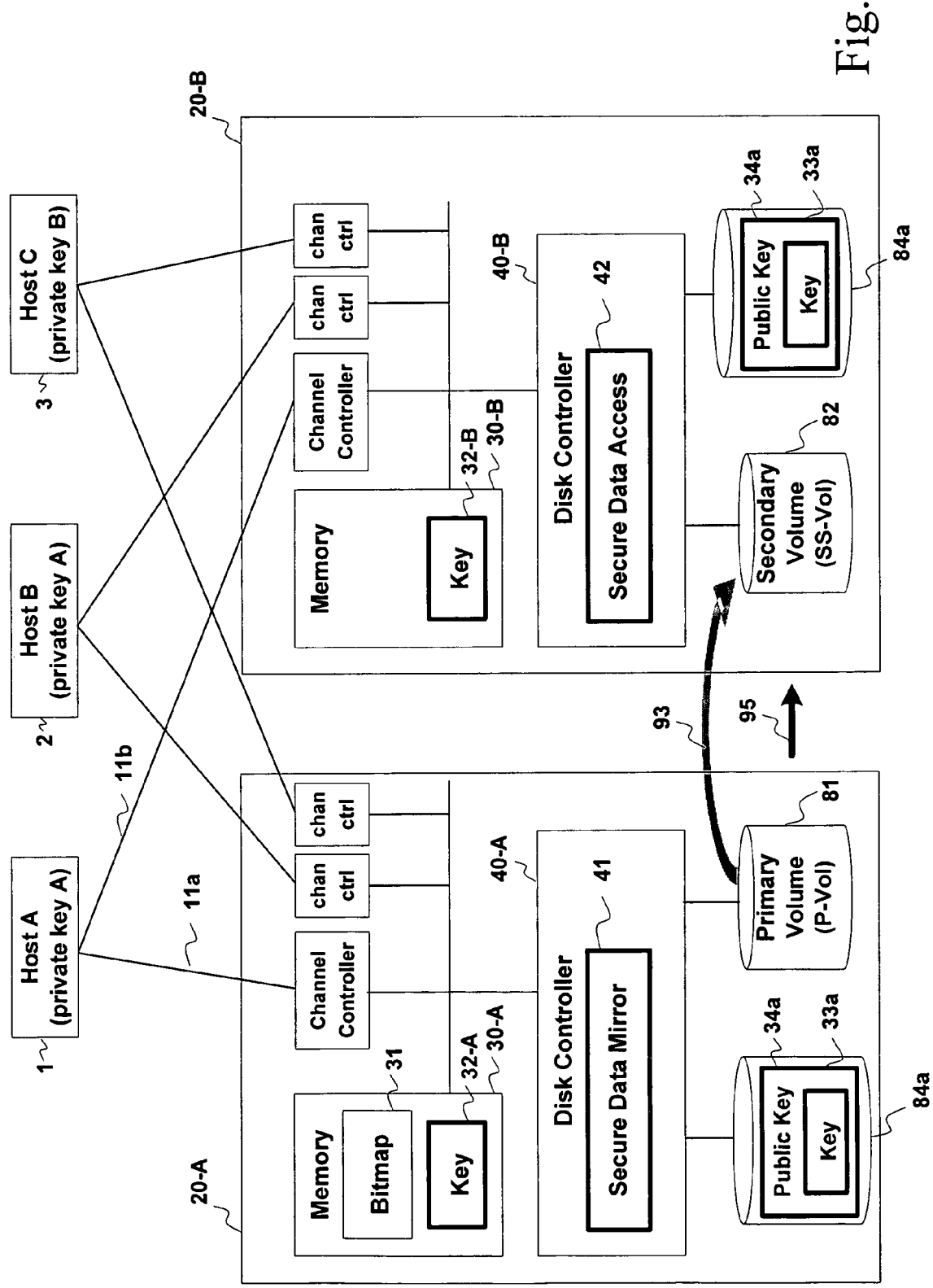
FIG. 15B is a block diagram showing yet another alternative configuration of a storage system according to the present invention.

The embodiment shown in FIG. 15 can be adapted to the configurations shown in FIGS. 1A-1C. FIG. 15A, for example, shows a configuration similar to the configuration of FIG. 1A; except that in the embodiment of FIG. 15A the volume 84a contains the copy keys. Likewise, FIG. 15B shows a configuration similar to the configuration of FIG. 1B. Each storage site 20a, 20b in FIG. 15B, however, includes the table shown in FIG. 16.

Figure 18:
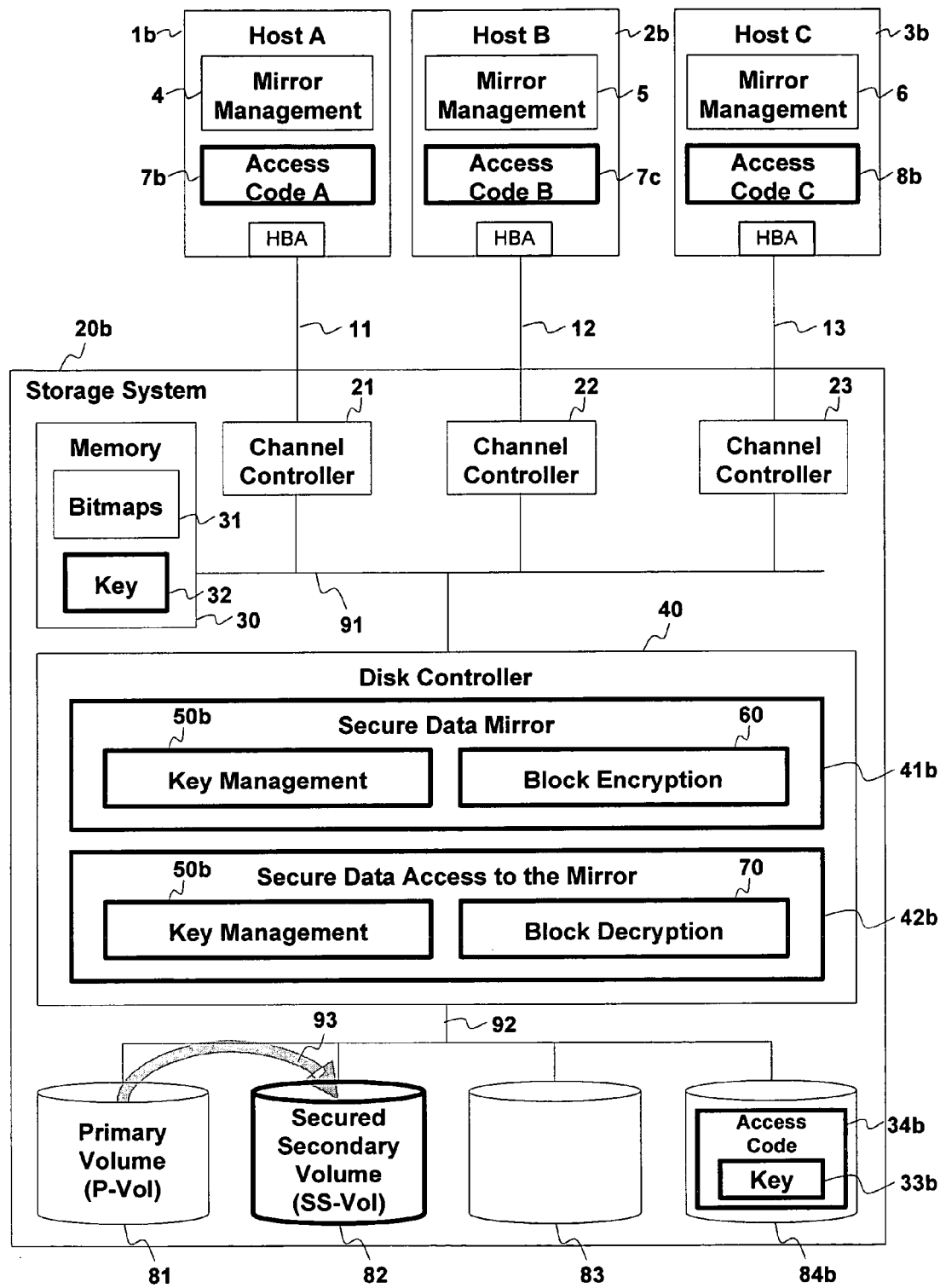
FIG. 18 is a block diagram showing a configuration of a storage system according to yet another illustrative embodiment of the present invention.

FIG. 18 shows yet another embodiment of the present invention, where the Copy Keys 33b are created (or otherwise obtained) and stored in the storage system 20b and protected by access codes 7b that are associated with the hosts 1b, 2b, 3b. As will become clear, the access codes serve to identify the hosts. The communication link 11 is typically an unsecured channel. Consequently, it is susceptible to attack by unauthorized individuals. It is therefore important to be able to provide secure communication between the host and the storage system. It is also important to ensure that the host is properly identified before accessing its Copy Key.

An example of an access code is the WWN (World Wide Name) of the host bus adapter (HBA) in the host that is used to connect the host to the storage system 20b. Whenever the host is attached to the SS-Vol, the Copy Key associated with the host can be obtained based on the WWN of the host. One technique is called Encapsulating Security Payload (ESP) over Fibre Channel, which has become the de-facto way to secure transmissions in the Fibre Channel network. A protocol called Challenge Handshake Authentication Protocol (CHAP) for use as a fibre channel security protocol is in the process of standardization. These techniques can be used to communicate the host's WWN to the storage system 20b in a secure fashion. As mentioned above, this technique is being discussed by the ANSI/T11.3 committee.

Figure 19:
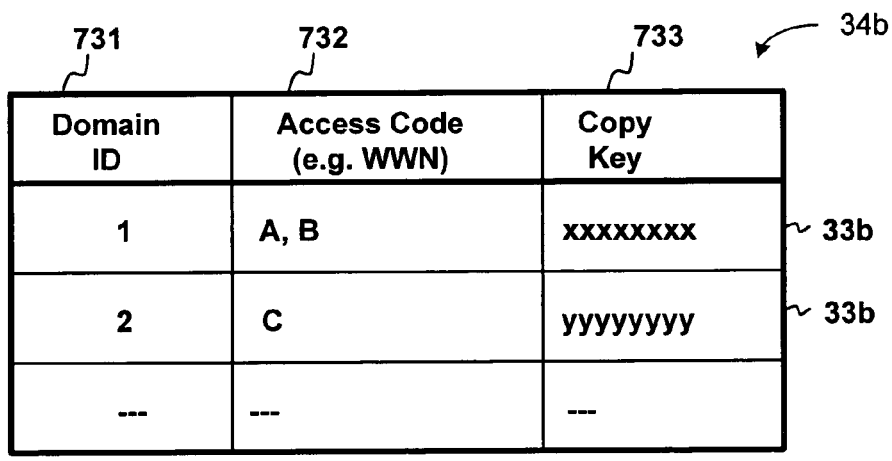
FIG. 19 illustrates how Copy Keys can be managed in accordance with the embodiment of the present invention shown in FIG. 18.

FIG. 19 shows an example of a table 34b for storing access codes in accordance with this particular embodiment of the present invention. As the figure shows, several hosts can be managed as a domain. A domain field 731 identifies the various domains. Hosts belonging to a domain are identified in an access code field 732. This field stores the access code (e.g., WWN of the host HBA) for each host in a particular domain. A key field 733 contains the Copy Key 33b that is used to perform secure data mirroring and to access an SS-Vol as disclosed above that is associated with each domain.

Figure 19A:
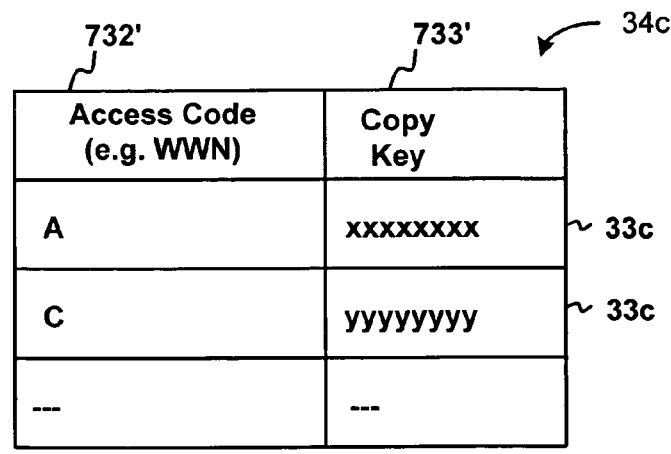
FIG. 19A illustrates an alternative way to manage Copy Keys.

FIG. 19A shows a variation of the table shown in FIG. 19 in which each host is associated with its own copy key. Thus, an access code field 732' contains an access code associated with each host. A key field 733' contains the copy key 33c associated with that host.

Using the WWN as the access codes serves to uniquely identify each host. Of course, other suitable forms of identification can be used. The amount of effort taken to authenticate a host using the access code technique shown in FIGS. 18 and 19 depends on the particular environment of the storage system. Thus, different forms of access codes (i.e., host identifiers) may be used depending on the level of security that is desired.

Returning to FIG. 18, the storage system 20b can receive the access code (e.g., WWN of the host's HBA) via a secure protocol. The access code can then be used to search the table 34b to obtain the copy key 33b that corresponds to the host. Secured data mirroring according to the present invention can then be performed as discussed above.

Figure 18A:
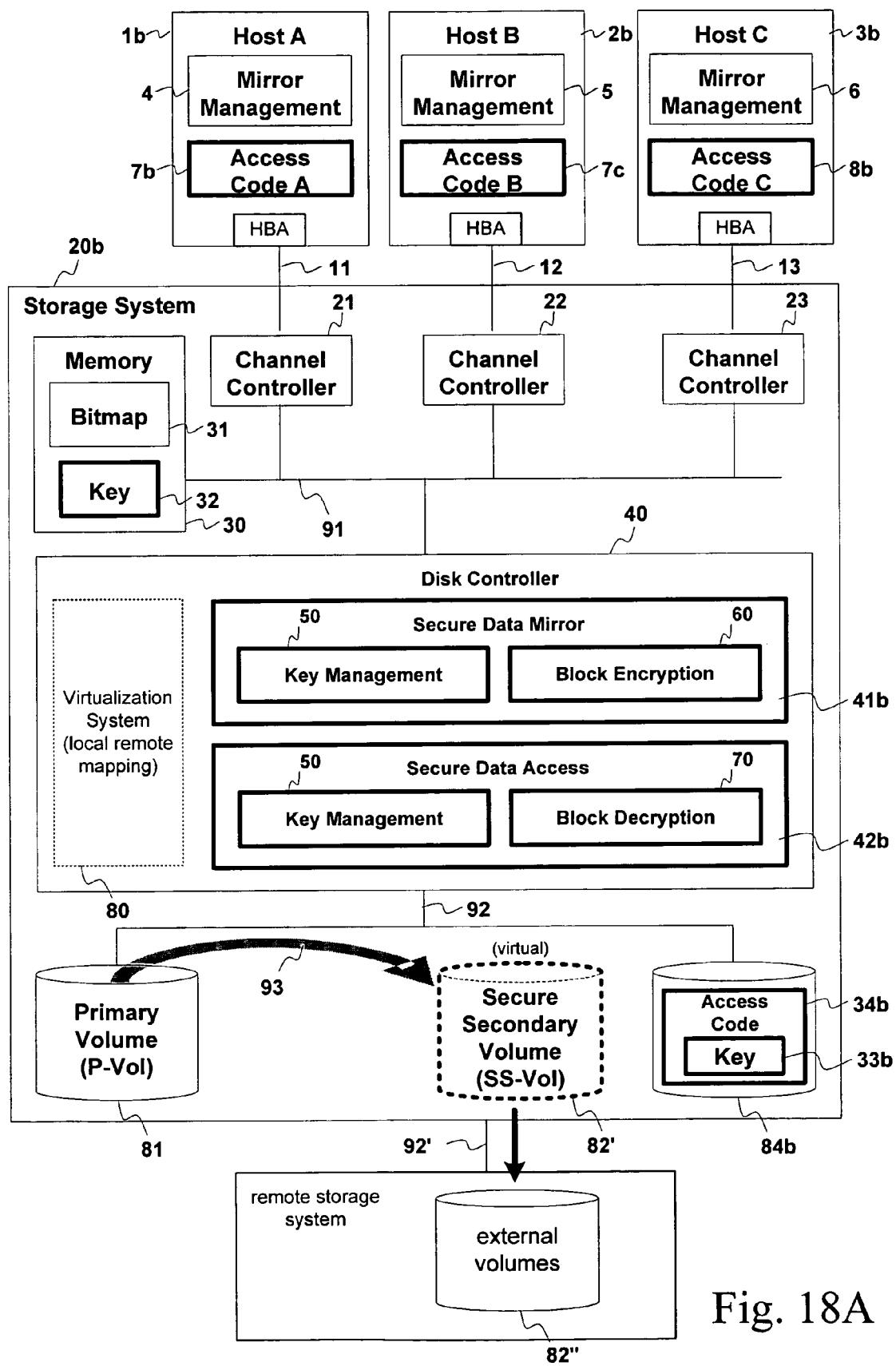
FIG. 18A is a block diagram showing an alternative configuration of a storage system according to the present invention.
Figure 18B:
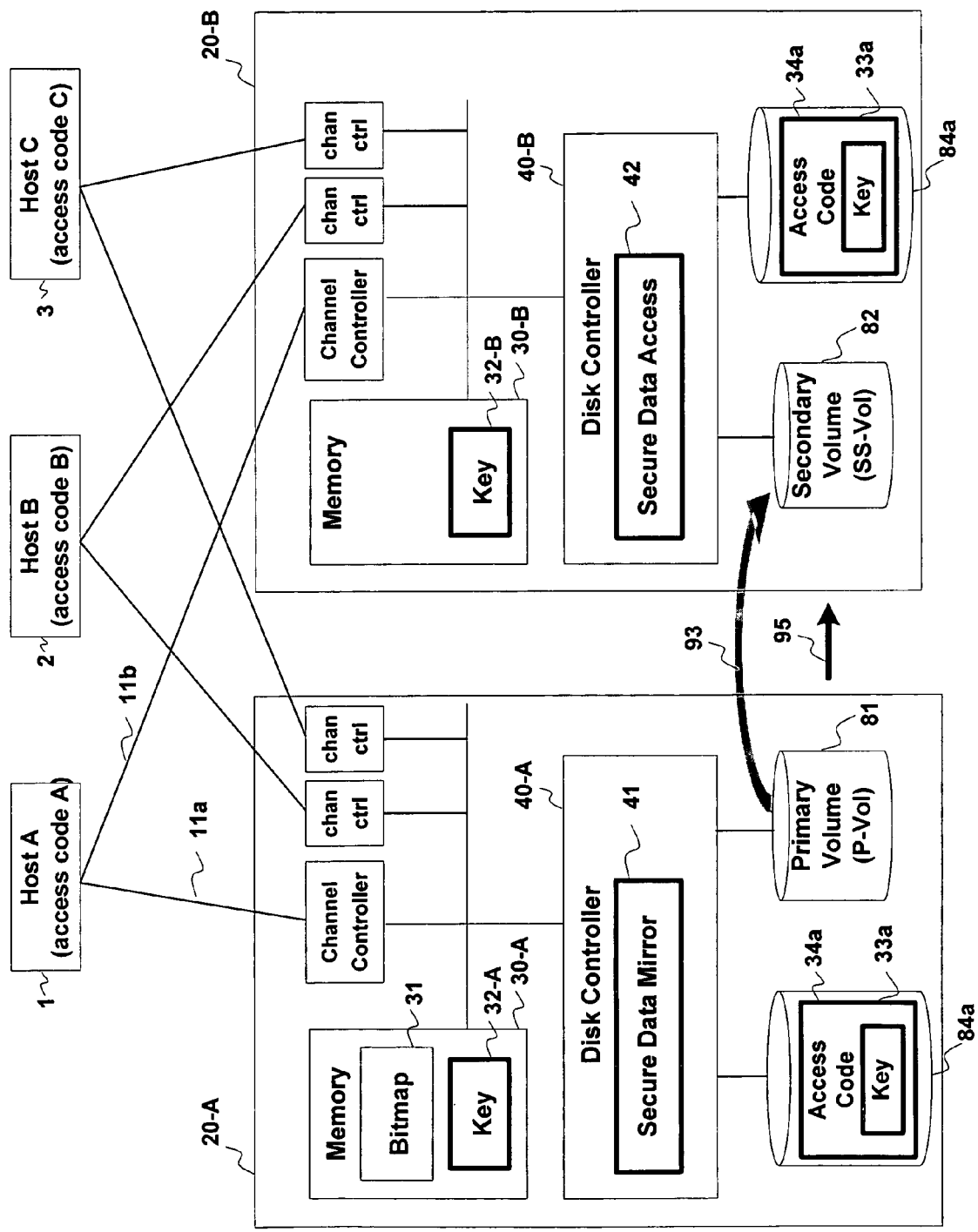
FIG. 18B is a block diagram showing yet another alternative configuration of a storage system according to the present invention.

FIG. 18A shows a variation of the embodiment of FIG. 18 configured in a manner similar to the configuration shown in FIG. 1A. FIG. 18b shows another variation of the embodiment of FIG. 18, configured in a manner similar to the configuration shown in FIG. 1B.

What is claimed is:

1. In a data storage system, a method for copying data comprising:
    receiving data access requests from a first host system;
    accessing a first data store to service said data access requests including reading data from said first data store and writing data to said first data store;
    performing a data mirroring operation in said data storage system in response to receiving data access requests that involve writing data to said first data store; and
    in connection with said data mirroring operation, performing steps of:
        generating a copy key that is associated with said first host system;
        encrypting data written by said first host system using said copy key to produce encrypted data; and
        communicating said encrypted data to a second data store, whereby said encrypted data can be stored in said second data store,
        wherein data written by said first host system that is stored on said first data store is mirrored to said second data store in encrypted form.

2. The method of claim 1 wherein said step of generating a copy key comprises receiving encrypted information from said first host system; and decrypting said encrypted information to produce decrypted information, said copy key being based on said decrypted information.

3. The method of claim 2 wherein said decrypted information is said copy key.

4. The method of claim 2 wherein said decrypted information is a private key, the method further comprising:
    storing an encrypted copy key on said data storage system, said encrypted copy key being produced using a public key; and
    applying said private key to said encrypted copy key to produce said copy key,
    said public key and said private key being generated in accordance with a public key encryption technique.

5. The method of claim 2 wherein said encrypted information is produced from an encryption operation using a first key and said step of decrypting includes using a second key, wherein said first key and said second key are a pair of keys generated according to a public key encryption technique.

6. The method of claim 1 further comprising storing a plurality of copy keys, said copy keys being associated with one or more host identifiers, wherein said step of generating a copy key comprises communicating with said first host system to obtain a first host identifier therefrom, said copy key being obtained from among said copy keys based on said first host identifier.

7. The method of claim 6 wherein said first host identifier is a world wide name (WWN) associated with a host bus adapter contained in said first host system, wherein said communicating is based on CHAP (challenge handshake authentication protocol) or ESP (encapsulating security payload).

8. The method of claim 1 further comprising receiving a data access request from a second host system to access data stored on said second data store, and in connection with said data access request:
 receiving an encrypted key from said second host system;
 decrypting said encrypted key to produce a second copy key; and
 performing a decryption operation on data stored in said second data store using said second copy key in order to service said data access request.

9. The method of claim 1 further comprising receiving a data access request from a second host system to access data stored on said second data store, and in connection with said data access request:
 receiving an encrypted key from said second host system;
 decrypting said encrypted key to produce a first key;
 using said first key, decrypting an encrypted copy key that is stored in said second data store to produce a second copy key, said encrypted copy key being produced using a second key; and
 performing a decryption operation on data stored on said second data store using said second-copy key in order to service said data access request,
 wherein said first key and said second key are a key pair generated in accordance with a public key encryption technique.

10. The method of claim 1 further comprising receiving a data access request from a second host system to access data stored on said second data store, and in connection with said data access request:
 receiving a host identifier from said second host system;
 accessing a second copy key from among a plurality of copy keys stored in said storage system using said host identifier; and
 performing a decryption operation on data stored on said second data store using said second copy key in order to service said data access request.

11. The method of claim 1 said first data store comprises physical storage co-located with physical storage comprising said second data store.

12. The method of claim 1 wherein physical storage comprising said second data store is remote from physical storage comprising said first data store.

13. In a data storage system configured to provide data storage to one or more hosts, a method for operating said data storage system comprising:
 receiving data requests from a first host, said data request being associated with a primary volume for exchange of data therewith;
 servicing said data request by exchanging data with said primary volume;
 performing a data mirroring operation in said data storage system if said exchanging data with said primary volume involves writing said data to said primary volume; and
 in connection with said data mirroring operation, performing steps of:
  storing in said data storage system a copy key that is associated with said first host including receiving from said first host an encrypted key and decrypting said encrypted key to produce said copy key;
  encrypting data stored on said primary volume using said copy key to produce encrypted data; and
  performing a write operation of said encrypted data to a virtual volume designated as a secondary volume,
  said virtual volume comprising one or more physical volumes disposed in a second data storage system separate from said data storage system,
  said write operation comprising one or more subsequent write operations of said encrypted data to said one or more physical volumes, thereby effecting data mirroring between said primary volume and said secondary volume wherein data written by said first host that is stored in said primary volume is mirrored to said one or more physical volumes in encrypted form.

14. The method of claim 13 further comprising accessing data from said secondary volume including:
 receiving from said second host a second encrypted key and decrypting said second encrypted key to produce a second copy key;
 storing said second copy key in said data storage system for subsequent data access requests from said second host; and
 processing subsequent data access requests from said second host including accessing encrypted data from said secondary volume and decrypting said encrypted data using said second copy key to produce read-out data,
 wherein said read-out data is clear data if said copy key and said second copy key are identical,
 wherein said read-out data is unintelligible data if said copy key and said second copy key are not identical.

15. The method of claim 13 further comprising performing a detach operation wherein said data mirroring between said primary volume and said secondary volume is terminated, including deleting said copy key from said data storage system.

16. In a data storage system configured to provide data storage to one or more hosts, a method for operating said data storage system comprising:
 receiving data requests from a first host, said data request being associated with a primary volume for exchange of data therewith;
 servicing said data request by exchanging data with said primary volume;
 performing a data mirroring operation in said data storage system if said exchanging data with said primary volume involves writing said data to said primary volume; and
 in connection with said data mirroring operation, performing steps of:
  generating a copy key, including:
   receiving from said first host an encrypted private key;
   decrypting said encrypted private key to produce a host private key; and decrypting an encrypted copy key that is stored in said data storage system using said host private key to produce said copy key;

storing said copy key in said data storage system;

encrypting data stored on said primary volume using said copy key to produce encrypted data; and performing a write operation of said encrypted data to a virtual volume designated as a secondary volume, said virtual volume comprising one or more physical volumes disposed in a second data storage system separate from said data storage system, said write operation comprising one or more subsequent write operations of said encrypted data to said one or more physical volumes, thereby effecting data mirroring between said primary volume and said secondary volume wherein data written by said first host that is stored in said primary volume is mirrored to said one or more physical volumes in encrypted form.

17. The method of claim 16 further comprising:

receiving from said second host a second encrypted private key;

decrypting said second encrypted private key to produce a second host private key;

decrypting a second encrypted copy key that is stored in said data storage system using said second host private key to produce a second copy key;

storing said second copy key in said data storage system for subsequent data access requests from said second host; and processing subsequent data access requests from said second host including accessing encrypted data from said secondary volume and decrypting said encrypted data using said second copy key to produce read-out data, wherein said read-out data is clear data if said copy key and said second copy key are identical, wherein said read-out data is unintelligible data if said copy key and said second copy key are not identical.

18. The method of claim 16 further comprising performing a detach operation wherein said data mirroring between said primary volume and said secondary volume is terminated, including deleting said copy key.

19. In a data storage system configured to provide data storage to one or more hosts, a method for operating said data storage system comprising:

receiving data requests from a first host, said data request being associated with a primary volume for exchange of data therewith;

servicing said data request by exchanging data with said primary volume;

performing a data mirroring operation in said data storage system if said exchanging data with said primary volume involves writing said data to said primary volume; and in connection with said data mirroring operation, performing steps of:

receiving from said first host first information that identifies said first host;

identifying a copy key from among a plurality of copy keys stored in said data storage system, using said first information;

encrypting data stored on said primary volume using said copy key to produce encrypted data; and performing a write operation of said encrypted data to a virtual volume designated as a secondary volume, said virtual volume comprising one or more physical volumes disposed in a second data storage system separate from said data storage system, said write operation comprising one or more subsequent write operations of said encrypted data to said one or more physical volumes, thereby effecting data mirroring between said primary volume and said secondary volume wherein data written by said first host that is stored in said primary volume is mirrored to said one or more physical volumes in encrypted form.

20. The method of claim 19 further comprising:

receiving from said second host second information that identifies said second host;

identifying a second copy key from among said plurality of copy keys, using said second information;

storing said second copy key in said data storage system for subsequent data access requests from said second host; and processing subsequent data access requests from said second host including accessing encrypted data from said secondary volume and decrypting said encrypted data using said second copy key to produce read-out data, wherein said read-out data is clear data if said copy key and said second copy key are identical, wherein said read-out data is unintelligible data if said copy key and said second copy key are not identical.

21. The method of claim 19 further comprising performing a detach operation wherein said data mirroring between said primary volume and said secondary volume is terminated, including deleting said copy key.

22. A method for operating a storage system comprising:

storing a plurality of copy keys, each copy key associated with one or more hosts;

receiving an I/O request from a first host, said I/O request associated with a data volume;

storing data associated with said I/O request to one or more blocks on said data volume; and in response to said I/O request, storing said data to a second data volume, including:

obtaining a first copy key from among said copy keys, said first copy key being associated with said first host;

encrypting data in said one or more blocks using said first copy key to produce one or more blocks of encrypted data; and storing said encrypted data on said second data volume, wherein said first host comprises a host bus adapter for communicating with said storage system, said step of obtaining a first copy key includes communicating with said first host to obtain therefrom a world wide name (WWN) associated with said host bus adapter, wherein said first copy key is obtained based on said WWN, wherein said communicating is based on CHAP (challenge handshake authentication protocol) or ESP (encapsulating security payload).

23. The method of claim 22 wherein said one or more blocks of encrypted data are stored on said second data volume at locations that are identical to locations of said one or more blocks on said data volume.

24. The method of claim 22 wherein said data volume and said second data volume comprise physical storage that is co-located in said storage system.

25. The method of claim 22 wherein said second data volume comprises physical storage that is remote from said storage system.

26. A method for operating a storage system comprising:
storing a plurality of copy keys, each copy key associated with one or more hosts;
receiving an I/O request from a first host, said I/O request associated with a data volume;
storing data associated with said I/O request to one or more blocks on said data volume; and
in response to said I/O request, storing said data to a second data volume, including:
obtaining a first copy key from among said copy keys, said first copy key being associated with said first host;
encrypting data in said one or more blocks using said first copy key to produce one or more blocks of encrypted data; and
storing said encrypted data on said second data volume,
wherein said step of storing a plurality of copy keys includes encrypting said copy keys and storing said copy keys as encrypted copy keys, wherein said step of obtaining a first copy key includes obtaining a host private key from said first host and decrypting one of said encrypted copy keys using said host private key to produce said first copy key.

27. The method of claim 26 wherein said step of obtaining a host private key includes receiving an encrypted host private key and decrypting said encrypted host private key to produce said host private key, said host private key and said host public key being a public-key/private-key pair produced in accordance with a public key encryption technique.

28. The method of claim 27 wherein said encrypted host private key is produced by encrypting said host private key using a first public key, the method further comprising storing a first private key in said storage system, wherein said step of decrypting said encrypted host private key includes a decryption operation using said first private key, said first public key and said first private being a public-key/private-key pair produced in accordance with a public key encryption technique.

29. A method for operating a storage system comprising:
storing a plurality of copy keys, each copy key associated with one or more hosts;
receiving an I/O request from a first host, said I/O request associated with a data volume;
storing data associated with said I/O request to one or more blocks on said data volume;
in response to said I/O request, storing said data to a second data volume, including:
obtaining a first copy key from among said copy keys, said first copy key being associated with said first host;
encrypting data in said one or more blocks using said first copy key to produce one or more blocks of encrypted data; and
storing said encrypted data on said second data volume;
obtaining a second copy key from among said copy keys, said second copy key being associated with a second host;
receiving from said second host a read request to read data from said second data volume, an in response thereto:
reading one or more blocks of data from said second volume in accordance with said read request;
performing a decryption operation on said one or more blocks of data using said second copy key to produce one or more result blocks; and
communicating said one or more result blocks to said second host, to service said read request.

30. A storage system comprising:
a plurality of physical storage units organized as a plurality of storage volumes;
one or more channel controllers, each configured to receive I/O requests from a host system;
a disk controller configured to:
perform I/O operations according to received I/O requests; and
if an I/O operation is a write operation, then
obtain a copy key associated with a first host system;
encrypt data stored in one or more blocks of a first storage volume that is associated with said first host system to produce one or more blocks of encrypted data, said data being encrypted using said copy key; and
store said one or more blocks of encrypted data on a second storage volume;
a plurality of copy keys, wherein said disk controller is further configured to communicate with said first host system to obtain host identification information therefrom, said copy key being associated with said host identification information, said copy key being obtained based on said host identification information,
wherein said host identification information is a WWN of a host bus adapter component in said first host system, wherein said disk controller communicates using one of CHAP and ESP to obtain said WWN from said first host system.

31. The system of claim 30 wherein said disk controller is further configured to communicate with said first host system to obtain encrypted information therefrom and to decrypt said encrypted information to produce said copy key.

32. The system of claim 31 wherein said encrypted information is produced using a public key, wherein said disk controller is further configured to decrypt said encrypted information using a private key, wherein said public key and said private key are a pair of keys produced according to a public key encryption technique.

33. A storage system comprising:
a first data storage system having a fist disk controller and first storage units;
a second data storage system separate from said first data storage system, having a second disk controller and second storage units; and
a data path between said first data storage system and said second data storage system for exchanging data therebetween,
said first data storage system further having a first memory to store a plurality of copy keys,
said first disk controller configured to perform data mirroring between a primary volume comprising storage on said first storage units and a secondary volume comprising storage on said second storage units in response to receiving a data write operation,
said first disk controller further configured to perform processing steps in connection with said data mirroring, said processing steps comprising:
storing in said first memory a copy key that is associated with a first host including receiving from said first host an encrypted key and decrypting said encrypted key to produce said copy key;
encrypting data stored on said primary volume using said copy key to produce encrypted data, wherein said data is from said first host; and
communicating said encrypted data to said secondary volume, thereby effecting said data mirroring between said primary volume and said secondary volume wherein data written by said first host that is stored in said primary volume is mirrored to said secondary volume in encrypted form.

34. The system of claim 33 wherein said second disk controller includes a second memory and is configured to:
receive from a second host a second encrypted key;
decrypt said second encrypted key to produce a second copy key;
store said second copy key in said second memory for subsequent data access requests from said second host; and
process subsequent data access requests from said second host by accessing encrypted data from said secondary volume and decrypting said encrypted data using said second copy key to produce read-out data,
wherein said read-out data is clear data if said copy key and said second copy key are identical,
wherein said read-out data is unintelligible data if said copy key and said second copy key are not identical.

35. The system of claim 33 wherein said first disk controller is further configured to perform a detach operation wherein said data mirroring between said primary volume and said secondary volume is terminated, including deleting said copy key from said first memory.

36. A storage system comprising:
a first data storage system having a fist disk controller and first storage units;
a second data storage system separate from said first data storage system, having a second disk controller and second storage units; and
a data path between said first data storage system and said second data storage system for exchanging data therebetween,
said first data storage system further having a first memory to store a plurality of copy keys,
said first disk controller configured to perform data mirroring between a primary volume comprising storage on said first storage units and a secondary volume comprising storage on said second storage units in response to receiving a data write operation,
said first disk controller further configured to perform processing steps in connection with said data mirroring, said processing steps comprising:
receiving from a first host an encrypted private key;
decrypting said encrypted private key to produce a host private key;
decrypting an encrypted copy key that is stored in said data storage system using said host private key to produce a copy key;
storing said copy in said first memory;
encrypting data stored on said primary volume using said copy key to produce encrypted data, wherein said data is from said first host; and
communicating said encrypted data to said secondary volume, thereby effecting said data mirroring between said primary volume and said secondary volume wherein data written by said first host that is stored in said primary volume is mirrored to said secondary volume in encrypted form.

37. The system of claim 36 wherein said second disk controller includes a second memory and is configured to:
receive from a second host a second encrypted private key;
decrypt said second encrypted private key to produce a second host private key;
decrypt a second encrypted copy key that is stored in said second data storage system using said second host private key to produce a second copy key;
store said second copy key in said second memory for subsequent data access requests from said second host; and
process subsequent data access requests from said second host by accessing encrypted data from said secondary volume and decrypting said encrypted data using said second copy key to produce read-out data,
wherein said read-out data is clear data if said copy key and said second copy key are identical,
wherein said read-out data is unintelligible data if said copy key and said second copy key are not identical.

38. The system of claim 36 wherein said first disk controller is further configured to perform a detach operation wherein said data mirroring between said primary volume and said secondary volume is terminated, including deleting said copy key from said first memory.

39. A storage system comprising:
a first data storage system having a fist disk controller and first storage units;
a second data storage system separate from said first data storage system, having a second disk controller and second storage units; and
a data path between said first data storage system and said second data storage system for exchanging data therebetween,
said first data storage system further having a first memory to store a plurality of copy keys,
said first disk controller configured to perform data mirroring between a primary volume comprising storage on said first storage units and a secondary volume comprising storage on said second storage units in response to receiving a data write operation,
said first disk controller further configured to perform processing steps in connection with said data mirroring, said processing steps comprising:
receiving from a first host first information that identifies said first host;
identifying a copy key from among a plurality of copy keys stored in said data storage system, using said first information;
storing said copy in said first memory;
encrypting data stored on said primary volume using said copy key to produce encrypted data, wherein said data is from said first host; and
communicating said encrypted data to said secondary volume, thereby effecting said data mirroring between said primary volume and said secondary volume wherein data written by said first host that is stored in said primary volume is mirrored to said secondary volume in encrypted form.

40. The system of claim 39 wherein said second disk controller includes a second memory and is configured to:
receive from a second host second information that identifies said second host; second information;
store said second copy key in said second memory for subsequent data access requests from said second host; and
process subsequent data access requests from said second host by accessing encrypted data from said secondary volume and decrypting said encrypted data using said second copy key to produce read-out data,
wherein said read-out data is clear data if said copy key and said second copy key are identical, wherein said read-out data is unintelligible data if said copy key and said second copy key are not identical.

41. The system of claim 39 wherein said first disk controller is further configured to perform a detach operation wherein said data mirroring between said primary volume and said secondary volume is terminated, including deleting said copy key from said first memory.

42. A storage system comprising:
- a plurality of channel controllers, each configured for communication with a host system;
- a memory having stored therein a plurality of copy keys, each copy key being associated with identification information of one or more host systems; and
- a disk controller configured for communication with a plurality of storage volumes, said disk controller operable to receive I/O requests from a host system and to communicate with a storage system that is associated with said host system to service said I/O requests, when an I/O request is a data write operation, said disk controller is further operable to:
- communicate with a first host system to obtain host identification information therefrom;
- obtain a first copy key from among said copy keys using said host identification information;
- encrypt data stored on a first storage volume using a first copy key to produce encrypted data, said first storage system being associated with said first host system; and
- store said encrypted data on a second storage system.

43. The system of claim 42 wherein said disk controller is further configured to communicate with said first host system using CHAP or ESP.

44. The system of claim 42 wherein said host identification information is a WWN of a host bus adapter in said first host system.

* * * * *

UNITED STATES PATENT AND TRADEMARK OFFICE
CERTIFICATE OF CORRECTION

| | | |
|---|---|---|
| PATENT NO. | : 7,269,743 B2 | Page 1 of 1 |
| APPLICATION NO. | : 10/893068 | |
| DATED | : September 11, 2007 | |
| INVENTOR(S) | : Yagawa et al. | |

It is certified that error appears in the above-identified patent and that said Letters Patent is hereby corrected as shown below:

ON THE TITLE PAGE

Please amend the inventor information (75):

(75)   Inventor:   Yuichi Yagawa, Tokyo (JP)
                   Nobuyuki Osaki, Tokyo (JP)

Signed and Sealed this

Twenty-eighth Day of September, 2010

David J. Kappos
*Director of the United States Patent and Trademark Office*